/ 1000

United States Patent
Andoni et al.

(10) Patent No.: US 12,014,279 B2
(45) Date of Patent: Jun. 18, 2024

(54) ANOMALY DETECTION USING A NON-MIRRORED DIMENSIONAL-REDUCTION MODEL

(71) Applicant: SparkCognition, Inc., Austin, TX (US)

(72) Inventors: Sari Andoni, Austin, TX (US); Udaivir Yadav, Austin, TX (US); Tyler S. McDonnell, Austin, TX (US)

(73) Assignee: SPARKCOGNITION, INC.

( * ) Notice: Subject to any disclaimer, the term of this patent is extended or adjusted under 35 U.S.C. 154(b) by 0 days.

(21) Appl. No.: 17/209,508

(22) Filed: Mar. 23, 2021

(65) Prior Publication Data

US 2021/0209477 A1 Jul. 8, 2021

Related U.S. Application Data

(63) Continuation of application No. 16/927,300, filed on Jul. 13, 2020, which is a continuation of application No. 16/716,850, filed on Dec. 17, 2019, now Pat. No. 10,733,512.

(51) Int. Cl.
| | |
|---|---|
| *G06N 3/086* | (2023.01) |
| *G06N 3/045* | (2023.01) |
| *G06N 3/082* | (2023.01) |
| *G06N 3/088* | (2023.01) |
| G06N 3/084 | (2023.01) |

(52) U.S. Cl.
CPC ............ *G06N 3/086* (2013.01); *G06N 3/045* (2023.01); *G06N 3/082* (2013.01); *G06N 3/088* (2013.01); *G06N 3/084* (2013.01)

(58) Field of Classification Search
CPC .......... G06N 3/08; G06N 3/086; G06N 3/082; G06N 3/088; G06N 3/084; G06N 3/04; G06N 3/0454
See application file for complete search history.

(56) References Cited

U.S. PATENT DOCUMENTS

| | | |
|---|---|---|
| 5,742,738 A | 4/1998 | Koza et al. |
| 6,532,449 B1 | 3/2003 | Goertzel et al. |
| 9,785,886 B1 | 10/2017 | Andoni et al. |
| 10,373,056 B1 | 8/2019 | Andoni et al. |
| 10,402,726 B1 | 9/2019 | Moore et al. |

(Continued)

OTHER PUBLICATIONS

Tripathi et al. "Asymmetric Stacked Autoencoder", IJCNN, 2017, pp. 911-918.*

(Continued)

*Primary Examiner* — Li Wu Chang
(74) *Attorney, Agent, or Firm* — Moore IP Law

(57) ABSTRACT

A method includes obtaining sensor data associated with operation of one or more devices and providing input data based on the sensor data to a dimensional-reduction model having an encoder portion and a decoder portion and configured such that the encoder portion is not mirrored by the decoder portion. The method also includes obtaining output data from the dimensional-reduction model responsive to the input data and determining a reconstruction error indicating a difference between the input data and the output data. The method also includes performing a comparison of the reconstruction error to an anomaly detection criterion and generating an anomaly detection output for the one or more devices based on a result of the comparison.

26 Claims, 20 Drawing Sheets

(56) References Cited

U.S. PATENT DOCUMENTS

| | | | |
|---|---|---|---|
| 10,489,713 | B1 | 11/2019 | Ernest |
| 10,552,727 | B2* | 2/2020 | Caspi .................. H04L 41/16 |
| 10,565,329 | B2 | 2/2020 | Greenwood |
| 10,594,716 | B2* | 3/2020 | Mehner ............... H04L 63/1416 |
| 11,544,676 | B2* | 1/2023 | Ghosh .................. G06Q 10/20 |
| 2001/0037346 | A1 | 11/2001 | Johnson |
| 2004/0077090 | A1 | 4/2004 | Short |
| 2005/0278703 | A1* | 12/2005 | Lo ..................... G06F 11/0751 |
| | | | 717/169 |
| 2013/0054603 | A1 | 2/2013 | Birdwell et al. |
| 2018/0165554 | A1 | 6/2018 | Zhang et al. |
| 2018/0247246 | A1 | 8/2018 | Biafore et al. |
| 2018/0300630 | A1 | 10/2018 | Andoni et al. |
| 2018/0314938 | A1 | 11/2018 | Andoni et al. |
| 2019/0122119 | A1 | 4/2019 | Husain |
| 2019/0130669 | A1* | 5/2019 | Boggio ................ G07C 5/0825 |
| 2019/0179896 | A1 | 6/2019 | Anisimovich et al. |
| 2019/0228312 | A1 | 7/2019 | Andoni et al. |
| 2019/0286506 | A1* | 9/2019 | Cheng .................. G06N 3/088 |
| 2020/0097720 | A1 | 3/2020 | Yang |
| 2020/0167966 | A1 | 5/2020 | Kim et al. |
| 2020/0210782 | A1 | 7/2020 | Servajean et al. |
| 2020/0210849 | A1 | 7/2020 | Kimon et al. |
| 2020/0234143 | A1 | 7/2020 | Yoon et al. |
| 2020/0396795 | A1* | 12/2020 | Bertolina ............. H01Q 1/3233 |
| 2021/0012363 | A1 | 1/2021 | Masuda |
| 2021/0089682 | A1 | 3/2021 | Bercich et al. |
| 2021/0209476 | A1 | 7/2021 | Andoni et al. |
| 2022/0201026 | A1* | 6/2022 | Wen ..................... H04L 67/12 |
| 2022/0206898 | A1* | 6/2022 | Yang .................... G06F 11/076 |

OTHER PUBLICATIONS

Kher et al. "A Detection Model for Anomalies in Smart Grid with Sensor Network", IEEE, 2012, pp. 4.*

Jiang et al. "Lifelong Disk Failure Prediction via GAN-based Anomaly Detection", ICCD, Nov. 2019, pp. 199-207.*

Nguyen et al. "GEE: A Gradient-based Explainable Variational Autoencoder for Network Anomaly Detection", 2019, pp. 10, https://arxiv.org/pdf/1903.06661.pdf.*

Abueleni N, S. (2017). "Optimizing Deep Learning Based on Deep Auto Encoder and Genetic Algorithm". Conference on Advanced Intelligent Systems and Informatics 2017, Advances in Intelligent Systems and Computing 639, pp. 663-672. DOI: 10.1007/978-3-319-64861-3_62 (Year: 2017).

David, O.E. et al. (2014). "Genetic Algorithms for Evolving Deep Neural Networks". GECCO'14, Jul. 12-16, 2014. pp. 1451-1452. DOI: 10.1145/2598394.2602287 (Year: 2014).

Ding, S. et al. (2011). "An optimizing BP neural network algorithm based on genetic algorithm." Artificial intelligence review 36.2 (2011): 153-162. DOI:10.1007/s10462-011-9208-z (Year: 2011).

H Liang, H-X. et al. (2015). "A proposed iteration optimization approach integrating backpropagation neural network with genetic algorithm." Expert Systems with Applications 42.1 (2015): 146-155. DOI:10.1016/j.eswa.2014.07.039 (Year: 2015).

Habeeb, F. et al. (2016). "Reducing error rate of deep learning using auto encoder and genetic algorithms." International Journal of Intelligent Computing and Information Sciences 16.4 (2016): 41-53. (Year: 2016).

Hua, W. et al. (2018). "Visual tracking based on stacked Denoising Autoencoder network with genetic algorithm optimization". Multimedia Tools and Applications vol. 77, pp. 4253-4269 (2018). DOI:10.1007/s11042-017-4702-1 (Year: 2018).

Jiang, S. et al. (2017). "Modified genetic algorithm-based feature selection combined with pre-trained deep neural network for demand forecasting in outpatient department." Expert systems with applications 82 (2017): 216-230. DOI: 10.1016/j .eswa .2017.04.017 (Year: 2017).

Lan Der, S. et al. (2015). "EvoAE—A new evolutionary method for training autoencoders for deep learning networks." 2015 IEEE 39th Annual Computer Software and Applications Conference. vol. 2. IEEE, 2015. (Year: 2015).

Rodrigu ez-Coayah U Iti, L. et al. (May 25, 2019). "Evolving autoencoding structures through genetic programming". Genetic Programming and Evolvable Machines (2019) 20:413-440. DOI:10. 1007/s10710-019-09354-4 (Year: 2019).

Sami Ullah Khan, Q. et al. (2017). "Training Deep Autoencoder via VLC-Genetic Algorithm". ICONIP 2017, Part II, LNCS 10635, pp. 13-22, 2017. DOI:10.1007/978-3-319-70096-0_2 (Year: 2017).

Sereno, D.M.D. (Jan. 2018). "Automatic Evolution of Deep AutoEncoders". MS thesis. 2018. 50 pages. (Year: 2018).

Taghanaki, S.A. et al. (2017). "Pareto-optimal multi-objective dimensionality reduction deepmammography classification." Computer methods and programs in biomedicine 145 (2017): 85-93. DOI:10. 1016/j.cmpb.2017.04.012 (Year: 2017).

Charte et al. "A practical tutorial on autoencoders for nonlinear feature fusion: Taxonomy, models, software and guidelines", Information Fusion, 2019, pp. 78-96.

Sun et al. "Learning a good representation with unsymmetrical auto-encoder", Neural Comput & Applic, 2016, pp. 1361-1367.

Autoencoder, https://web.archive .org/web/2019082017 4445/https:// en.wikipedia .org/wiki/Autoencoder, Jul. 2019, pp. 11.

* cited by examiner

Input set of 200 models at start of epoch N

400

450

Evaluate model fitness and cluster models into species based on genetic distance

460

Determine species fitness, identify "elite species," and remove stagnant species Identify "elite members" of "elite species" as well as "overall elites"

ANOMALY DETECTION USING A NON-MIRRORED DIMENSIONAL-REDUCTION MODEL

CROSS-REFERENCE TO RELATED APPLICATIONS

The present application claims priority to and is a continuation of U.S. patent application Ser. No. 16/927,300 entitled "COOPERATIVE USE OF A GENETIC ALGORITHM AND AN OPTIMIZATION TRAINER FOR AUTOENCODER GENERATION," filed Jul. 13, 2020, which claims priority to and is a continuation of U.S. patent application Ser. No. 16/716,850 entitled "COOPERATIVE USE OF A GENETIC ALGORITHM AND AN OPTIMIZATION TRAINER FOR AUTOENCODER GENERATION," filed Dec. 17, 2019 (now issued as U.S. Pat. No. 10,733,512), the contents of each of which are incorporated herein by reference in their entirety.

BACKGROUND

Computers are often used to solve complex quantitative and qualitative problems. For problems that involve a large data set, a specially trained professional, known as a data scientist, may be hired. The data scientist interprets the data set and constructs models that can be processed by computers to solve the problem. However, hiring data scientists is cost prohibitive for many organizations.

For certain types of problems, advanced machine learning techniques may be available to develop a model, such as a neural network, that is comparable in accuracy to a model that would be created by a data scientist. However, such machine learning techniques can require a large number of iterations to converge on an acceptable neural network, and as a result, can use significant computing resources to generate and train a neural network.

SUMMARY

The present disclosure describes automated model building systems and methods that cooperatively use a genetic algorithm and selective optimization training to generate and train an autoencoder to monitor one or more devices for anomalous operational states. Combining a genetic algorithm with selective optimization training as described herein enables generation of an autoencoder that is able to detect anomalous operation significantly before failure of a monitored device, and the cooperative use of the genetic algorithms and optimization training is faster and uses fewer computing resources than training a monitoring autoencoder using backpropagation or genetic algorithms alone.

In accordance with the described techniques, a combination of a genetic algorithm and an optimization algorithm (such as backpropagation, a derivative free optimizer (DFO), an extreme learning machine (ELM), or a similar optimizer) may be used to generate and then train an autoencoder. As used herein, the terms "optimizer," "optimization trainer," and similar terminology, is not to be interpreted as requiring such components or steps to generate literal optimal results (e.g., 100% prediction or classification accuracy). Rather, these terms indicate an attempt to generate an output that is improved in some fashion relative to an input. For example, an optimization trainer that receives a trainable autoencoder as input and outputs a trained autoencoder may attempt to decrease reconstruction losses of the trainable autoencoder by modifying one or more attributes of the trainable autoencoder.

A genetic algorithm is an iterative adaptive search heuristic inspired by biological natural selection. The genetic algorithm starts with a population of models. The population of models may be generated using a randomized process. In implementations described herein, each model defines an autoencoder, and the autoencoders of the population include a variety of different architectures, connection weights, activation functions, etc. Over the course of several epochs (also known as generations), the population is modified using biology-inspired reproduction evolutionary operations, such as crossover (e.g., combining characteristics of two autoencoders), mutation (e.g., randomly modifying a characteristic of an autoencoder), stagnation/extinction (e.g., removing autoencoders from the population, such as when the accuracy of an autoencoder has not improved in several epochs), and selection (e.g., identifying the best performing autoencoders based on one or more selection criteria). In addition, selected autoencoders of an epoch may be selected for reproduction to generate a trainable autoencoder. The trainable autoencoder is trained using an optimization process, such as backpropagation, to generate a trained autoencoder. The trained model can then be re-inserted into the genetic algorithm for continued evolution.

Training an autoencoder that is generated by breeding the best performing population members of an epoch may serve to reinforce traits that improve performance, such as particular architectures, activation functions, etc.). Reintroducing the trained autoencoder back into the genetic algorithm facilitates convergence of the genetic algorithm to an acceptably accurate solution (e.g., autoencoder) faster, for example because traits that improve performance are available for inheritance in later epochs of the genetic algorithm.

DETAILED DESCRIPTION

Figure 1:
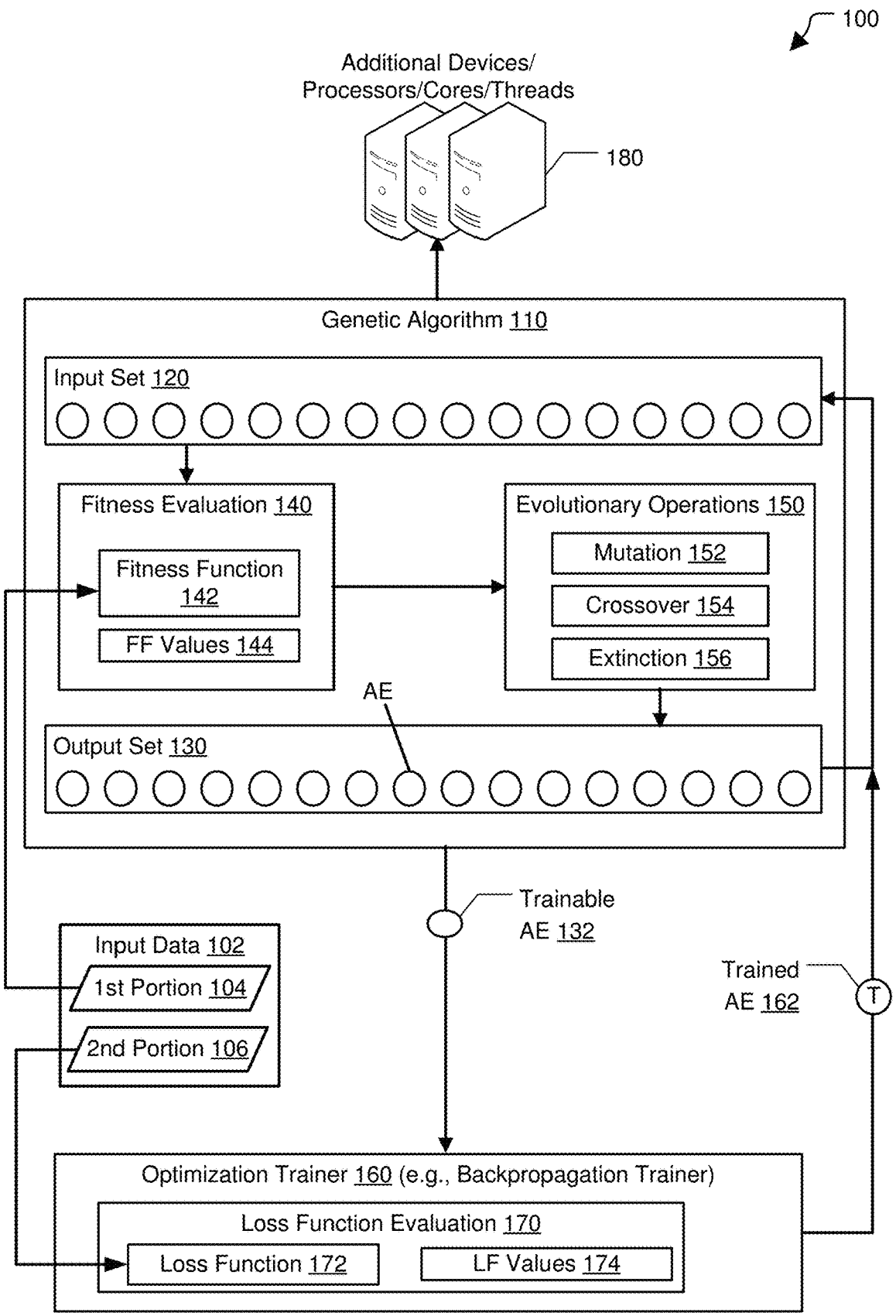
FIG. 1 illustrates an example of a system that is operable to support cooperative execution of a genetic algorithm and an optimization trainer to generate an autoencoder.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Referring to FIG. 1, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a genetic algorithm 110 and an optimization trainer 160. The optimization trainer 160 can be, for example, a backpropagation trainer, a derivative free optimizer (DFO), an extreme learning machine (ELM), etc. In particular implementations, the genetic algorithm 110 is executed on a different device, processor (e.g., central processor unit (CPU), graphics processing unit (GPU) or other type of processor), processor core, and/or thread (e.g., hardware or software thread) than the optimization trainer 160. The genetic algorithm 110 and the optimization trainer 160 may cooperate to automatically generate an autoencoder model of a particular data set, such as illustrative input data 102. The system 100 performs an automated model building process that enables users, including inexperienced users, to quickly and easily build highly accurate autoencoder models based on a specified data set.

The genetic algorithm 110 performs fitness evaluation 140 and evolutionary operations 150. In this context, fitness evaluation 140 includes evaluating each autoencoder of an input set 120 using a fitness function 142 to determine a fitness function value 144 ("FF" value in FIG. 1) for each autoencoder of the input set 120. The fitness function values 144 are used to select one or more autoencoders of the input set 120 to modify using one or more of the evolutionary operations 150. In FIG. 1, the evolutionary operations 150 include mutation operations 152, crossover operations 154, and extinction operations 156, each of which is described further below.

The genetic algorithm 110 represents a recursive search process. Consequently, each iteration of the search process (also called an epoch or generation of the genetic algorithm) has an input set 120 (also referred to herein as an input population) and an output set 130 (also referred to herein as an output population). The input set 120 of an initial epoch of the genetic algorithm 110 may be randomly or pseudo-randomly generated. After that, the output set 130 of one epoch can be, in whole or in part, the input set 120 of the next (non-initial) epoch, as further described herein.

The input set 120 and the output set 130 may each include a plurality of models, where each model includes data representative of an autoencoder. For example, each model may specify an autoencoder by at least an architecture, a series of activation functions, and connection weights. The architecture (also referred to herein as a topology) of an autoencoder includes a configuration of layers or nodes and connections therebetween. The models may also be specified to include other parameters, including but not limited to bias values/functions and aggregation functions.

Figure 2:
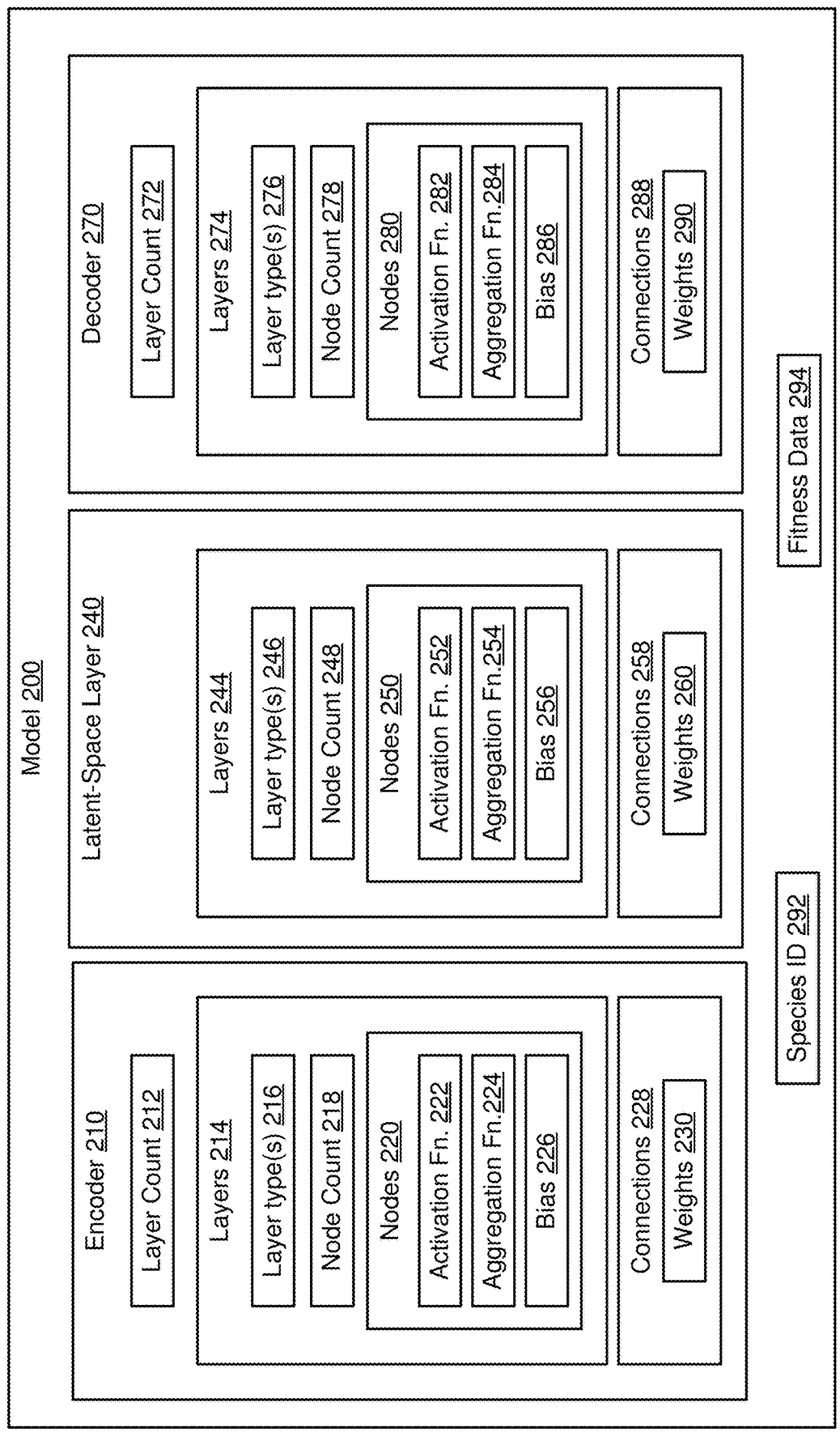
FIG. 2 illustrates an example of a data model used in a particular implementation to represent an autoencoder during cooperative execution of a genetic algorithm and an optimization trainer.

FIG. 2 illustrates an example of a model 200 that can be used to represent an autoencoder during cooperative execution of the genetic algorithm 110 and the optimization trainer 160 of FIG. 1. The model 200 represents the autoencoder by defining hyperparameters and parameters of the autoencoder. In this context, the hyperparameters of an autoencoder define the network architecture (e.g., the specific arrangement of layers or nodes and connections) of the autoencoder, and the "parameters" of the autoencoder refer to values that are learned or updated during optimization training of the autoencoder. For example, in FIG. 2, the parameters of the autoencoder correspond to connection weights 230, 260, and 290 and biases 226, 256, and 286. FIG. 2 illustrates several sets of hyperparameters. In some implementations, a subset of the hyperparameters illustrated in FIG. 2 can be used to define an autoencoder.

In a particular implementation, the model 200 represents an autoencoder as a set of nodes 220, 250, 280 and connections 228, 258, 288 therebetween. In such implementations, the hyperparameters of the autoencoder include the data descriptive of each of the nodes 220, 250, 280, such as an activation function 222 of each node 220, an aggregation function 224 of each node 220, and data describing node pairs linked by corresponding connections 228. The activation function of a node is a step function, sine function, continuous or piecewise linear function, sigmoid function, hyperbolic tangent function, or another type of mathematical function that represents a threshold at which the node is activated. The aggregation function is a mathematical function that combines (e.g., sum, product, etc.) input signals to the node. An output of the aggregation function may be used as input to the activation function.

In another particular implementation, the model 200 represents an autoencoder on a layer-by-layer basis. For example, the hyperparameters define layers 214, 244, 274, and each layer 214, 244, 274 includes layer data, such as a layer type 216, 246, 276 and a node count 218, 248, 278. Examples of layer types 216, 246, 276 include fully connected, long short-term memory (LSTM) layers, gated recurrent units (GRU) layers, and convolutional neural network (CNN) layers. In some implementations, all of the nodes of a particular layer use the same activation function and aggregation function. In such implementations, specifying the layer type and node count fully may describe the hyperparameters of each layer. In other implementations, the activation function and aggregation function of the nodes of a particular layer can be specified independently of the layer type of the layer. For example, in such implementations, one fully connected layer can use a sigmoid activation function and another fully connected layer (having the same layer type as the first fully connected layer) can use a tan h activation function. In such implementations, the hyperparameters of a layer include layer type, node count, activation function, and aggregation function. Further, a complete autoencoder is specified by specifying an order of layers and the hyperparameters of each layer of the autoencoder.

In yet another implementation, the model 200 represents the autoencoder by specifying the architectures of the encoder 210, the latent-space layer 240, and the decoder 270 of the autoencoder. In such examples, the latent-space layer 240 is specified in any of the manners described above for specifying a layer. The encoder 210 and decoder 270 are specified as a set of layers corresponding to a particular architecture. For example, the encoder 210 can be specified by a layer count 212 and data describing each layer, such as a layer type and a node count. In another example, a set of pre-defined encoder and/or decoder architectures can be used, in which case, an identifier of a particular architecture can be used to fully describe the encoder 210 or the decoder 270. Alternatively, the identifier of the particular architecture can be used to fully describe a base architecture which is modified by other data elements to define the encoder 210 or the decoder 270.

In FIG. 2, the model 200 also includes a species identifier (ID) 292 and fitness data 294.

The species ID 292 indicates which of a plurality of species the model 200 is classified in, as described further below. The fitness data 294 indicates a fitness function value 144 of the model 200, a species fitness value of the species of the model 200, or both, based on a most recent fitness evaluation 140 of the model 200.

Returning to FIG. 1, the fitness function value 144 of a particular autoencoder represents how well output data of the particular autoencoder recreates input data provided to the particular autoencoder. For example, the fitness function 142 measures or indicates reconstruction loss associated with the autoencoder, as described further with reference to FIG. 3.

In a particular aspect, fitness evaluation 140 of the models of the input set 120 is performed in parallel. To illustrate, the system 100 may include devices, processors, cores, and/or threads 180 in addition to those that execute the genetic algorithm 110 and the optimization trainer 160. These additional devices, processors, cores, and/or threads 180 can perform the fitness evaluation 140 of the models of the input set 120 in parallel based on a first portion 104 of the input data 102 and may provide the resulting fitness function values 144 to the genetic algorithm 110.

In a particular aspect, the genetic algorithm 110 is configured to perform speciation. For example, the genetic algorithm 110 may be configured to cluster the models of the input set 120 into species based on "genetic distance" between the models. Because each model represents an autoencoder, the genetic distance between two models may be based on differences in nodes, activation functions, aggregation functions, connections, connection weights, layers, layer types, latent-space layers, encoders, decoders, etc. of the two models. In an illustrative example, the genetic algorithm 110 may be configured to serialize a model into a bit string. In this example, the genetic distance between models may be represented by the number of differing bits in the bit strings corresponding to the models. The bit strings corresponding to models may be referred to as "encodings" of the models. Speciation is further described with reference to FIG. 4.

The mutation operation 152 and the crossover operation 154 are highly stochastic under certain constraints and a defined set of probabilities optimized for model building, which produces reproduction operations that can be used to generate the output set 130, or at least a portion thereof, from the input set 120. In a particular aspect, the genetic algorithm 110 utilizes intra-species reproduction but not inter-species reproduction in generating the output set 130. Including intra-species reproduction and excluding inter-species reproduction may be based on the assumption that because they share more genetic traits, the models of a species are more likely to cooperate and will therefore more quickly converge on a sufficiently accurate autoencoder. In some examples, inter-species reproduction may be used in addition to or instead of intra-species reproduction to generate the output set 130. Generally, the mutation operation 152 and the crossover operation 154 are selectively performed on models that are more fit (e.g., have high fitness function values 144, fitness function values 144 that have changed significantly between two or more epochs, or both). Crossover and mutation are described further below.

The extinction operation 156 uses a stagnation criterion to determine when a species should be omitted from a population used as the input set 120 for a subsequent epoch of the genetic algorithm 110. Generally, the extinction operation 156 is selectively performed on models that are less fit (e.g., have low fitness function values 144, fitness function values 144 that have changed little over several epochs, or both). Stagnation and extinction are described further below.

In accordance with the present disclosure, cooperative execution of the genetic algorithm 110 and the optimization trainer 160 is used arrive at a solution faster than would occur by using a genetic algorithm alone or an optimization trainer alone. Additionally, in some implementations, the genetic algorithm 110 and the optimization trainer 160 evaluate fitness using different data sets and with different measures of fitness so as to improve differentiation of normal and abnormal operational states of monitored equipment. To facilitate cooperative execution, a model (referred to herein as a trainable autoencoder, or trainable AE 132 in FIG. 1) is occasionally sent from the genetic algorithm 110 to the optimization trainer 160 for training. In a particular implementation, the trainable autoencoder 132 is based on crossing over and/or mutating the fittest models (based on the fitness evaluation 140) of the input set 120. In such implementations, the trainable autoencoder 132 is not merely a selected model of the input set 120; rather, the trainable autoencoder 132 represents a potential advancement with respect to the fittest models of the input set 120.

The optimization trainer 160 uses a second portion 106 of the input data 102 to train the connection weights and biases of the trainable autoencoder 132, thereby generating a trained autoencoder 162. The optimization trainer 160 does not modify the architecture of the trainable autoencoder 132.

During optimization, the optimization trainer 160 provides the second portion 106 of the input data 102 to the trainable autoencoder 132 to generate output data. The optimization trainer 160 performs loss function evaluation 170 by comparing the data input to the trainable autoencoder 132 to the output data to determine loss function values 174 based on a loss function 172. In some implementations, the optimization trainer 160 or portions thereof is executed on a different device, processor, core, and/or thread than the genetic algorithm 110. In such implementations, the genetic algorithm 110 can continue executing additional epoch(s) while the connection weights of the trainable autoencoder 132 are being trained by the optimization trainer 160. When training is complete, the trained autoencoder 162 is input back into (a subsequent epoch of) the genetic algorithm 110, so that the positively reinforced "genetic traits" of the trained autoencoder 162 are available to be inherited by other models in the genetic algorithm 110.

Figure 3:
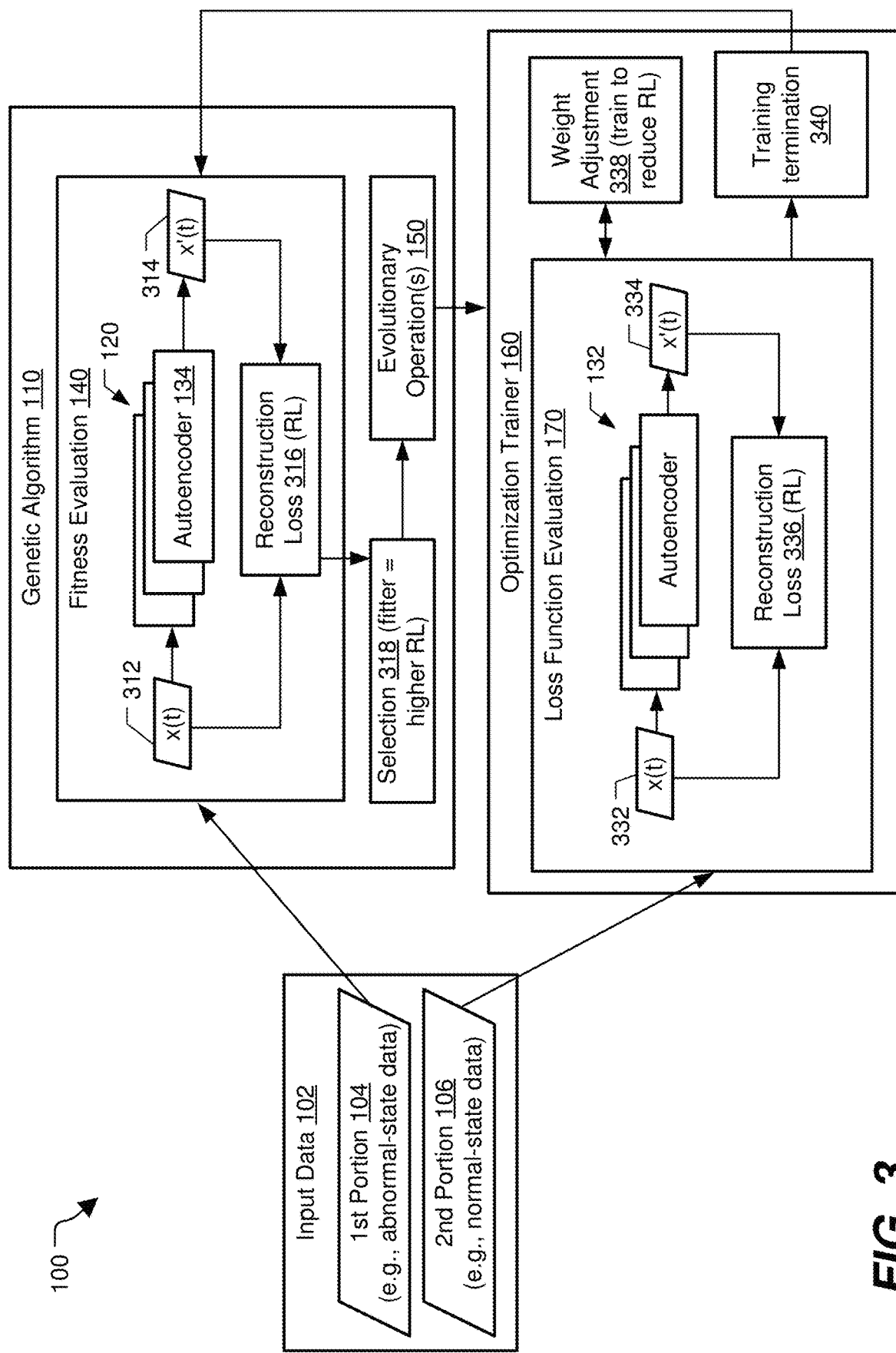
FIG. 3 illustrates an example of the system of FIG. 1 with additional detail according to a particular implementation.

FIG. 3 illustrates an example of the system 100 of FIG. 1 with additional details of the genetic algorithm 110 and the optimization trainer 160 according to a particular implementation. The system 100 in the example illustrated in FIG. 3 is configured to generate an autoencoder to monitor a device (e.g., a mechanical, electrical, hydraulic, pneumatic, magnetic, or optical device) based on sensor data associated with operation of the device. The autoencoder is configured to detect when the device is operating abnormally or anomalously. To detect anomalous operation of the device, the autoencoder receives input data based on the sensor data and generates output data based on the input data. The autoencoder is configured to be relatively accurate (e.g., to have low reconstruction loss) when reconstructing input data during normal operation of the device and to be relatively inaccurate (e.g., to have high reconstruction loss) when reconstructing input data during anomalous operation of the device. Thus, the reconstruction loss associated with particular sensor data can be used as an indication of whether the device is operating in a normal operational mode or an anomalous operational mode. An advantage of monitoring the device in this manner is that all operational states of the device do not need to be characterized in advance, which can be time consuming and expensive. Rather, it is sufficient to identify from among a set of sensor data, one or more subsets representing abnormal or anomalous operations. Such data is often easy to isolate from historical data by selecting data immediately preceding a known device failure or fault condition.

In FIG. 3, to magnify the distinction between the reconstruction loss for normal operational data and the reconstruction loss for anomalous operational data, the genetic algorithm 110 and the optimization trainer 160 use different portions 104, 106 of the input data 102 and have different goals for the respective reconstruction losses 316, 336. For example, the genetic algorithm selects as fitter those autoencoders 134 of the input set 120 that have higher reconstruction loss 316 based on the first portion 104 of the input data 102, where the first portion 104 of the input data 102 corresponds to abnormal-state data. In contrast, the optimization trainer 160 trains one or more trainable autoencoders received from the genetic algorithm 110 to reduce reconstruction loss 336 based on the second portion 106 of the input data 102, where the second portion 106 corresponds to normal-state operational data.

In FIG. 3, the genetic algorithm 110 includes the fitness evaluation 140, a selection process 318, and the evolutionary operations 150. The fitness evaluation 140 in FIG. 3 illustrates calculation of reconstruction loss 316 as the fitness function value 144.

In the example illustrated in FIG. 3, input data samples 312 from the first portion 104 of the input data 102 are provided as input to one or more autoencoders 134 of the input set 120. Each of the one or more autoencoders 134 generates an output data sample 314 corresponding to each input data sample 312. The fitness evaluation 140 calculates the reconstruction loss 316 for each input data sample 312/output data sample 314 pair. The fitness evaluation 140 may aggregate or average a set of reconstruction losses 316 for various input data sample 312/output data sample 314 pairs to generate an aggregate or average reconstruction loss 316 for each of the one or more autoencoders 134.

The selection operation 318 selects a subset (e.g., one or several) of the one or more autoencoders 134 on which to perform one or more of the evolutionary operations 150. The selection is based on relative fitness of each of the one or more autoencoders 134. In FIG. 3, the selection operation 318 uses the reconstruction loss 316 as a fitness metric (e.g., as the fitness function value 144). In general, fitter autoencoders are selected for mutation and crossover operations 152, 154. Additionally, less fit autoencoders may be selected for extinction 156. As explained above, in the example illustrated in FIG. 3, the selection operation 318 considers a first autoencoder to be fitter than a second autoencoder if the first autoencoder has higher reconstruction loss 316 than the second autoencoder based on the first portion 104 of the input data 102. The selected subset of the input set 120 is subjected to the evolutionary operations 150, which are described in greater detail below, and one or more trainable autoencoders 132 resulting from the evolutionary operations 150 are provided to the optimization trainer 160.

Input data samples 332 from the second portion 106 of the input data 102 are provided as input to one or more trainable autoencoders 132. Each of the one or more trainable autoencoders 132 generates an output data sample 334 corresponding to each input data sample 332. The loss function evaluation 170 calculates the reconstruction loss 336 for each input data sample 332/output data sample 334 pair. The loss function evaluation 170 may aggregate or average a set of reconstruction losses 336 for various input data sample 332/output data sample 334 pairs to generate an aggregate or average reconstruction loss 336 for each of the one or more trainable autoencoders 132.

Weight adjustment operation 338 updates the connection link weights of a trainable autoencoder 132 based on the reconstruction loss 336 associated with the trainable autoencoder 132. For example, the weight adjustment operation 338 can include backpropagation, another optimization process, or both, to calculate the updated connection link weights. The weight adjustment operation 338 updates the connection link weights to reduce the reconstruction loss 336 associated with the trainable autoencoder 132 responsive to the second portion 106 of the input data 102.

A training termination operation 340 determines when to cease adjusting the connection link weights of the trainable autoencoder 132 and to return the trainable autoencoder as the trained autoencoder 162 of FIG. 1, to the genetic algorithm 110 for inclusion in the input set 120 of a subsequent epoch of the genetic algorithm.

Thus, in the example of FIG. 3, the genetic algorithm 110 preferentially selects autoencoders that do not reconstruct abnormal-state data well and trains such autoencoders to reconstruct normal-state data well. As a result, an autoencoder generated by the system 100 is able to accurately discriminate between data associated with normal operational states and data associated with anomalous operational states.

Operation of the system 100 is now described with reference to FIGS. 4-8. It is to be understood, however, that in alternative implementations certain operations may be performed in a different order than described. Moreover, operations described as sequential may instead be performed at least partially concurrently, and operations described as being performed at least partially concurrently may instead be performed sequentially.

During a configuration stage of operation, a user can specify the input data 102 and a particular data field or a set of data fields in the input data 102 to be modeled. The data field(s) to be modeled may correspond to input nodes and output nodes of an autoencoder that is to be generated by the system 100. In particular implementations, the user can also configure other aspects of the model. For example, the user may provide input to indicate a particular data field of the data set that is to be included in the model or a particular data field of the data set that is to be omitted from the model. As another example, the user may provide input to constrain allowed autoencoder architectures. To illustrate, the model may be constrained to include a particular number of nodes in the latent-space layer, an hourglass architecture, or a mirrored architecture. Alternatively, the architecture of the model can be unconstrained, the number of latent-space layer nodes can be unspecified, or both. Various network topologies or architectures of autoencoders are described in more detail below. An advantage of allowing the genetic algorithm to generate unconstrained, non-hourglass, non-mirrored, or other novel architectures is that such architectures can reduce processing resources used to monitor equipment, can detect anomalous behavior earlier, more accurately, or both.

In particular implementations, the user can configure aspects of the genetic algorithm 110. For example, the user may provide input to limit a number of epochs that will be executed by the genetic algorithm 110. Alternatively, the user may specify a time limit indicating an amount of time that the genetic algorithm 110 has to generate the model, and the genetic algorithm 110 may determine a number of epochs that will be executed based on the specified time limit. To illustrate, an initial epoch of the genetic algorithm 110 may be timed (e.g., using a hardware or software timer at the computing device executing the genetic algorithm 110), and a total number of epochs that are to be executed within the specified time limit may be determined accordingly. As another example, the user may constrain a number of models evaluated in each epoch, for example by constraining the size of the input set 120 and/or the output set 130. As yet another example, the user can define a number of trainable autoencoders 132 to be trained by the optimization trainer 160 and fed back into the genetic algorithm 110 as trained autoencoders 162.

In particular aspects, configuration of the genetic algorithm 110 also includes performing pre-processing steps based on the input data 102. For example, the user may specify which portions of the input data 102 correspond to or represent normal operational states, which portions of the input data 102 correspond to or represent abnormal operational states, or both.

After the above-described configuration stage, the genetic algorithm 110 may automatically generate an initial set of models based on the input data 102 and any user specified configuration settings. Each model of the initial set of models is specified as described with reference to FIG. 2.

The initial set of models may be input into an initial epoch of the genetic algorithm 110 as the input set 120, and at the end of the initial epoch, the output set 130 generated during the initial epoch may become the input set 120 of the next epoch of the genetic algorithm 110. In some examples, the input set 120 has a user specified number of models. For example, as shown in a first stage 400 of operation in FIG. 4, the input set include 200 models. In alternative examples, a different number of models are included in the input set 120 and/or the output set 130.

For the initial epoch of the genetic algorithm 110, the architectures of the models in the input set 120 may be randomly or pseudo-randomly generated within constraints specified by any previously input configuration settings. Accordingly, the input set 120 includes models with multiple distinct architectures. For example, a first model may have a first architectures including: a first number of layers in the encoder (each of which has a corresponding number of nodes and layer type), a first number of layers of the decoder (each of which has a corresponding number of nodes and layer type), and a first number of nodes in the latent-space layer. In this example, a second model of epoch may have a second architecture including: a second number of layers in the encoder (each of which has a corresponding number of nodes and layer type), a second number of layers of the decoder (each of which has a corresponding number of nodes and layer type), and a second number of nodes in the latent-space layer. In some implementations, user configuration settings can limit one or more of the architectural features of the models. For example, a user can specify a number of nodes of the latent-space layer that is to be used by all of the models. As another example, the user can specify that the decoder of each model be a mirror image of the encoder of the model (such architectures are referred to herein as "mirrored" architectures). As yet another example, the user can specify that each layer of the encoder has no more nodes than the next layer closer to the input layer (e.g., a count of nodes per layer of the encoder monotonical decrease between the input layer and the latent-space layer) or that each layer of the decoder has no fewer nodes than the next layer closer to the output layer (e.g., a count of nodes per layer of the decoder monotonical increases between the latent-space layer and the output layer) (such architectures are referred to herein as "hourglass" architectures). As still another example, the user can specify that a count of layers of the encoder equal a count of layers of the decoder.

The genetic algorithm 110 may automatically assign layer types, layer counts, node counts per layer, activation functions, aggregation functions, biases, connection weights, etc. to each model of the input set 120 for the initial epoch. In some aspects, the connection weights are assigned randomly or pseudo-randomly. In some implementations, a single activation function is used for each node of a particular model or each node of a particular layer. For example, a sigmoid function may be used as the activation function of each node of the particular model or layer. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes or layers of a model may have different types of activation functions. In other implementations, the activation function assigned to each node may be randomly or pseudo-randomly selected (from the set of allowed activation functions) for each node of the particular model. Aggregation functions may similarly be randomly or pseudo-randomly assigned for the models in the input set 120 of the initial epoch. Thus, the models of the input set 120 of the initial epoch may have different architectures and different connection weights.

Continuing to a second stage 450 of operation, each model of the input set 120 may be tested based on the first portion 104 of input data 102 to determine model fitness. For example, the first portion 104 of input data 102 may be provided as input data samples 312 to each model, which processes the input data samples 312 (according to the architecture, connection weights, activation function, etc., of the respective model) to generate corresponding output data samples 314. Input data sample/output data sample pairs are evaluated to determine how well the autoencoder of the model reconstructed the first portion 104 of the input data 102. The fitness evaluation operation 140 evaluates the fitness of each model based on performance (e.g., reconstruction loss) of the model, complexity (or sparsity) of the model, or a combination thereof.

Figure 4:
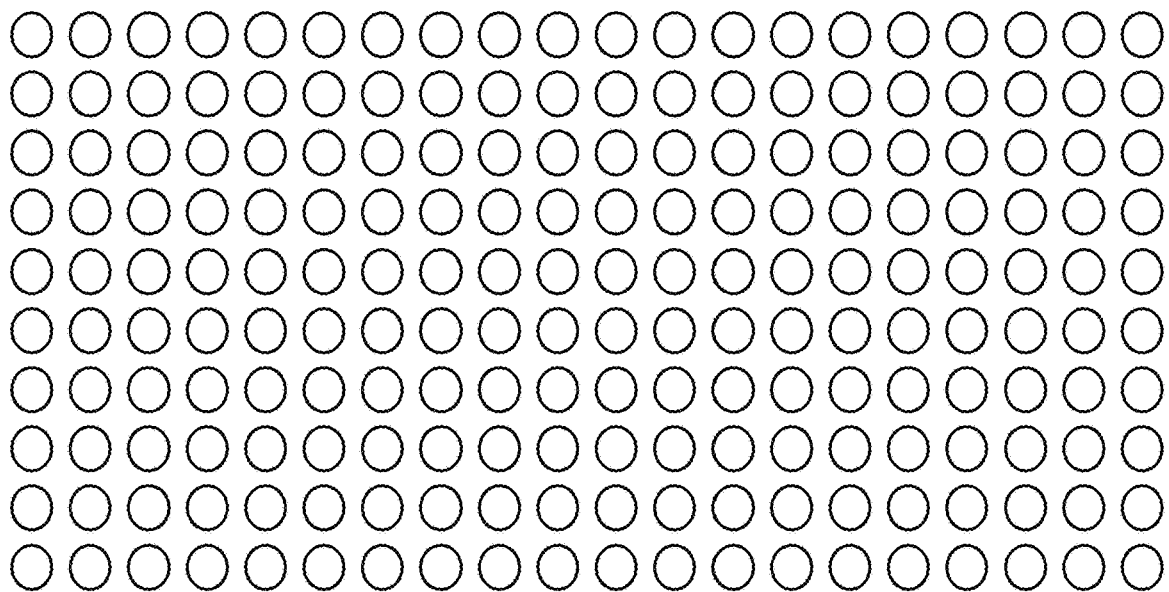
FIG. 4 illustrates particular examples of first and second stages of operation at the system of FIG. 1.
Figure 4:
Figure 4:
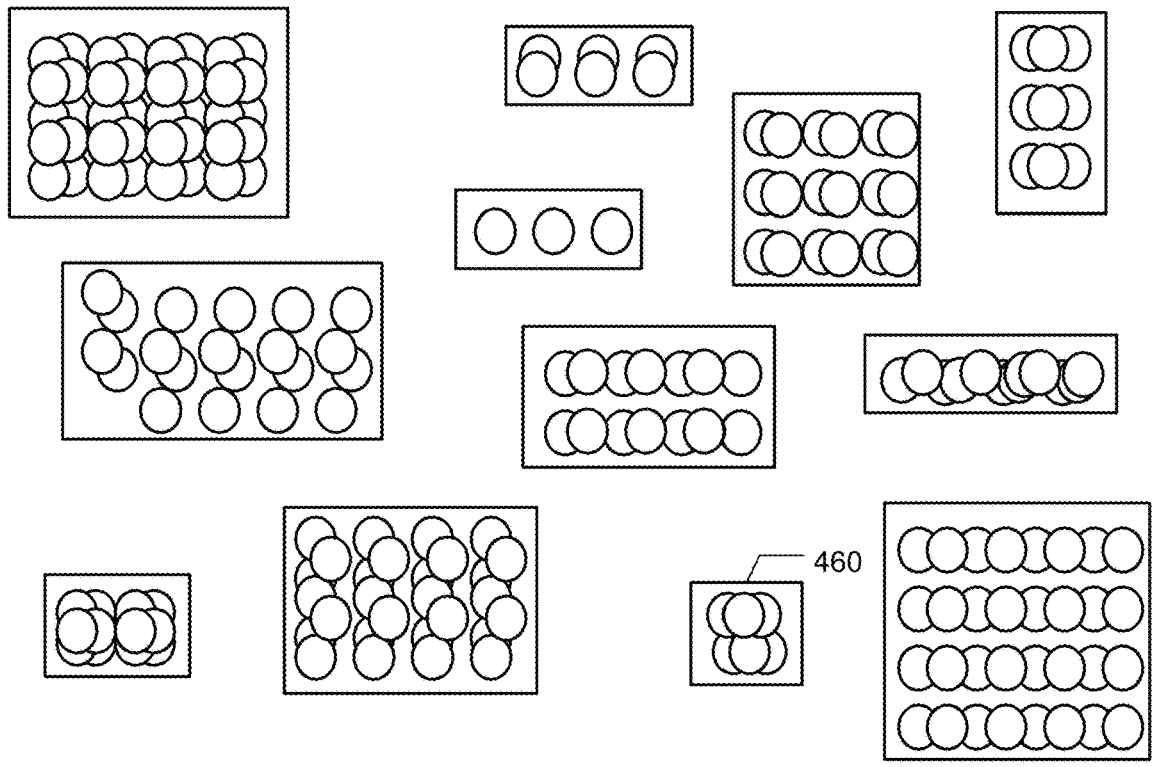

As shown in FIG. 4, the second stage 450 may include clustering the models into species based on genetic distance. In a particular aspect, the species ID 292 of each of the models is set to a value corresponding to the species that the model has been clustered into.

Figure 5:
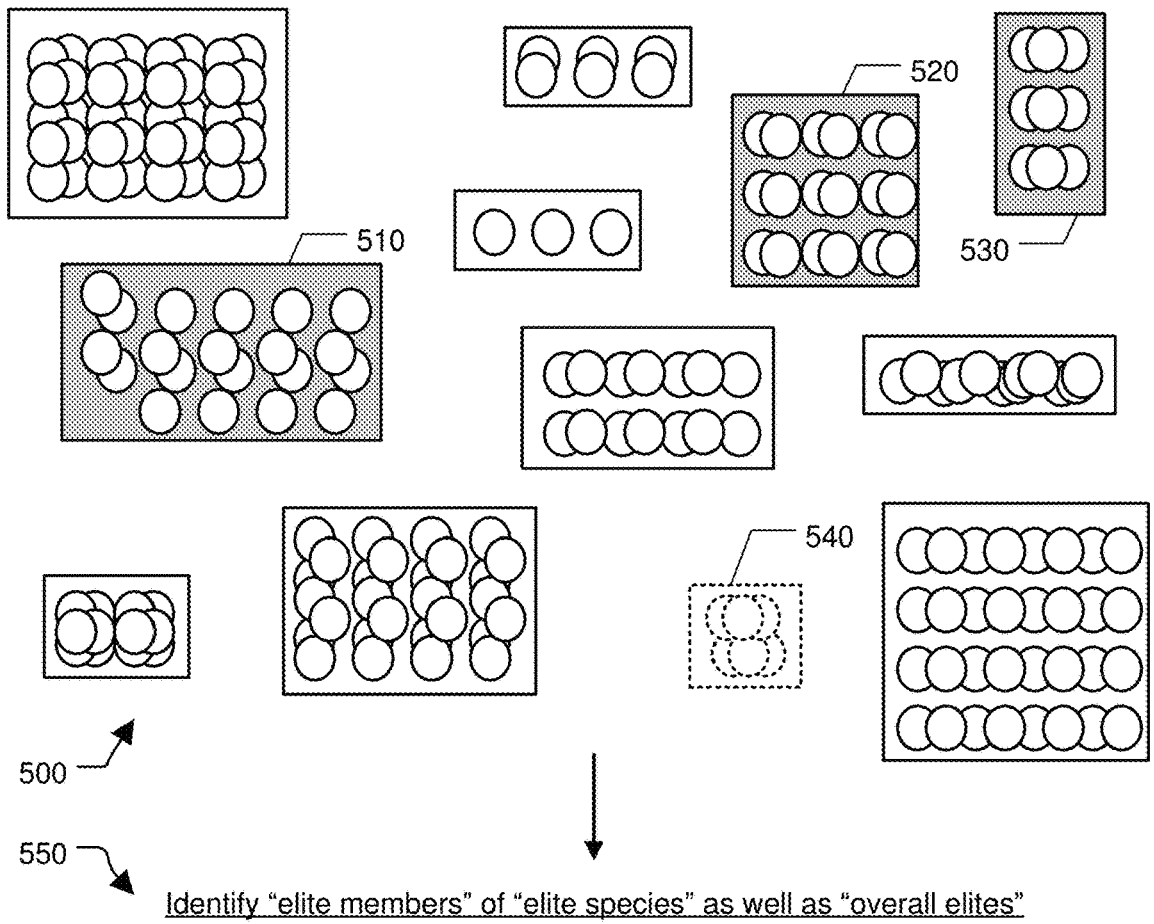
FIG. 5 illustrates particular examples of third and fourth stages of operation at the system of FIG. 1.
Figure 5:
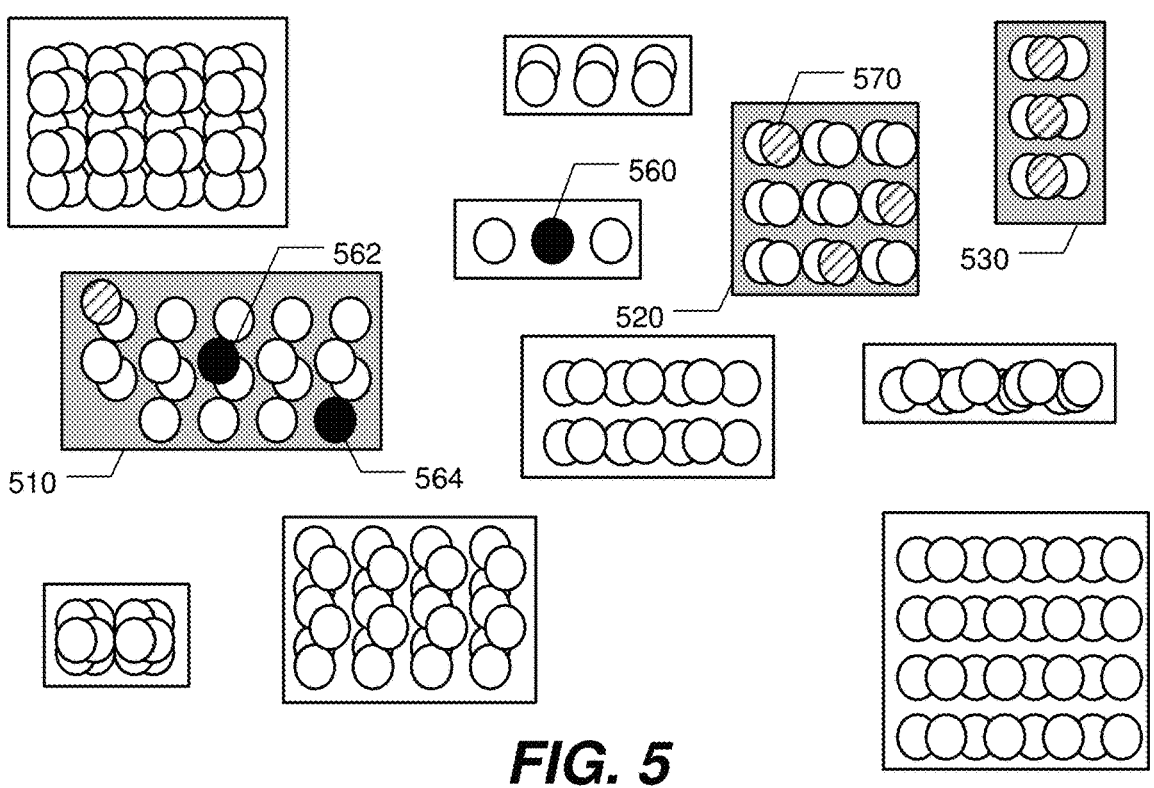

Continuing to FIG. 5, during a third stage 500 and a fourth stage 550 of operation, a species fitness may be determined for each of the species. The species fitness of a species may be a function of the fitness of one or more of the individual models in the species. As a simple illustrative example, the species fitness of a species may be the average of the fitness function values 144 of the individual models in the species. As another example, the species fitness of a species may be equal to the fitness function value 144 of the fittest or least fit individual model in the species. In alternative examples, other mathematical functions may be used to determine species fitness. The genetic algorithm 110 may maintain a data structure that tracks the fitness of each species across multiple epochs. Based on the species fitness, the genetic algorithm 110 may identify the "fittest" species, shaded and denoted in FIG. 5 as "elite species." Although three elite species 510, 520, and 530 are shown in FIG. 5, in other examples a different number of elite species are identified.

In a particular aspect, the genetic algorithm 110 uses species fitness to determine if a species has become stagnant and is therefore to become extinct. As an illustrative non-limiting example, the extinction operation 156 can be performed when a stagnation criterion is satisfied. The stagnation criterion indicates that a species has become stagnant if the fitness of that species remains within a particular range (e.g., +/−5%) for a particular number (e.g., 5) epochs. If a species satisfies the stagnation criterion, the species and all underlying models may be removed from the genetic algorithm 110. In the illustrated example, species 540 of FIG. 5 is removed, as shown in the third stage 500 through the use of broken lines.

Proceeding to the fourth stage 550, the fittest models of each "elite species" may be identified. The fittest models overall may also be identified. In the illustrated example, the three fittest models of each "elite species" are denoted "elite members" and shown using a hatch pattern. Thus, model 570 is an "elite member" of the "elite species" 520. The three fittest models overall are denoted "overall elites" and are shown using black circles. Thus, models 560, 562, and 564 are the "overall elites" in the illustrated example. As shown in FIG. 5 with respect to the model 560, an "overall elite" need not be an "elite member," e.g., may come from a non-elite species. In an alternate implementation, a different number of "elite members" per species and/or a different number of "overall elites" may be identified.

Figure 6:
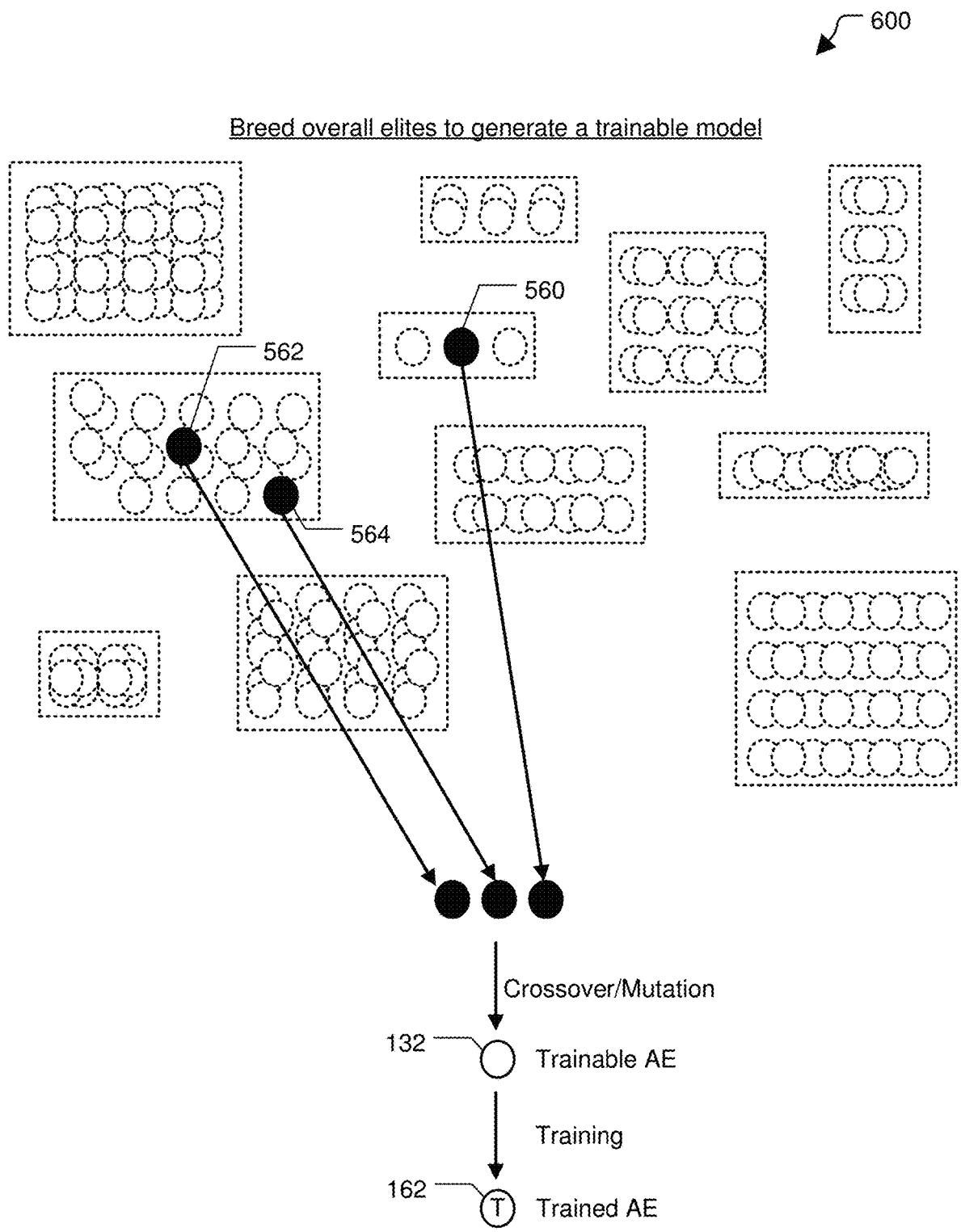
FIG. 6 illustrates a particular example of a fifth stage of operation at the system of FIG. 1.

Referring now to FIG. 6, during a fifth stage 600 of operation, the "overall elite" models 560, 562, and 564 may be genetically combined to generate the trainable autoencoder 132. For example, genetically combining models may include crossover operations (e.g., the crossover operation 154 of FIG. 1) in which a portion of one model is added to a portion of another model, as further illustrated in FIG. 7.

As another example, a random mutation may be performed on a portion of one or more of the "overall elite" models 560, 562, 564 and/or the trainable autoencoder 132. The trainable autoencoder 132 may be sent to the optimization trainer 160, as described with reference to FIG. 1. The optimization trainer 160 trains connection weights of the trainable autoencoder 132 based on the second portion 106 of the input data 102. When training is complete, the resulting trained autoencoder 162 may be received from the optimization trainer 160 and input into a subsequent epoch of the genetic algorithm 110.

Figure 7:
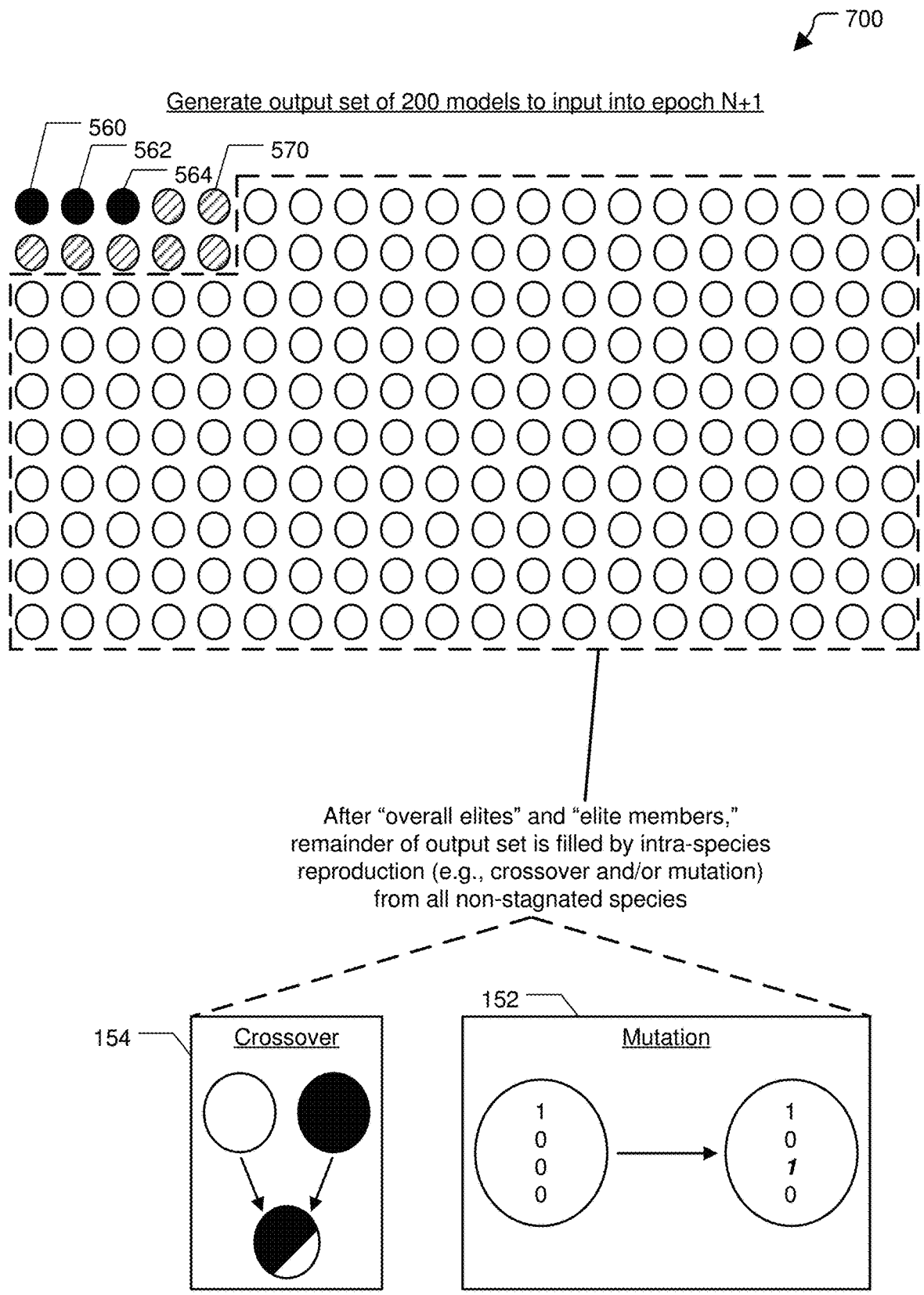
FIG. 7 illustrates a particular example of a sixth stage of operation at the system of FIG. 1.

Continuing to FIG. 7, while the optimization trainer 160 trains the trainable autoencoder 132, the output set 130 of the epoch may be generated in a sixth stage 700 of operation. In the illustrated example, the output set 130 includes the same number of models, e.g., 200 models, as the input set 120. The output set 130 may include each of the "overall elite" models 560-564. The output set 130 may also include each of the "elite member" models, including the model 570. Propagating the "overall elite" and "elite member" models to the next epoch may preserve the "genetic traits" that caused such models to be assigned high fitness values.

The rest of the output set 130 may be filled out by random intra-species reproduction using the crossover operation 154 and/or the mutation operation 152. In the illustrated example, the output set 130 includes 10 "overall elite" and "elite member" models, so the remaining 190 models may be randomly generated based on intra-species reproduction using the crossover operation 154 and/or the mutation operation 152. After the output set 130 is generated, the output set 130 may be provided as the input set 120 for the next epoch of the genetic algorithm 110.

During the crossover operation 154, a portion of one model is combined with a portion of another model, where the size of the respective portions may or may not be equal. To illustrate with reference to the model "encodings" described with respect to FIG. 1, the crossover operation 154 may include concatenating bits 0 to p of one bit string with bits p+1 to q of another bit string, where p and q are integers and p+q is equal to the total size of a bit string that represents a model resulting from the crossover operation 154. When decoded, the resulting bit string after the crossover operation 154 produces an autoencoder that differs from each of its "parent" autoencoders in terms of architecture, activation function, aggregation function, bias value/function, link weight, or any combination thereof.

Thus, the crossover operation 154 may be a random or pseudo-random biological operator that generates a model of the output set 130 by combining aspects of a first model of the input set 120 with aspects of one or more other models of the input set 120. For example, a layer from a first model of the input set 120 can be added to a second model of the input set 120. In this example, a location to add the layer to the second model can be selected randomly such that any position of the autoencoder (e.g., a location between any two layers of the autoencoder) is equally likely. Alternatively, in some implementations, the layer is added with equal likelihood to either the encoder or the decoder of the second model. In such implementations, after a selection of the encoder or the decoder is made, the location with the encoder or decoder is selected randomly with equal likelihood. Selecting first between the encoder and decoder with equal likelihood can limit extreme differences between the count of layers of the encoder and the count of layers of the decoder. For example, if a model has more layers in the encoder than the decoder before the crossover operation 154 is performed and a new layer is added to the model with every possible location having equal likelihood, the overall probability is that the new layer will be added to the encoder side since there are more possible locations on the encoder side (as a result of there being more layers on the encoder side). Selecting to add the new layer to either the encoder side or the decoder side with equal likelihood limits the effect of such skewing.

In some implementations, rather than operating on models of the input set 120, the crossover operation 154 is performed on a model (or models) generated by mutation of one or more models of the input set 120. For example, the mutation operation 152 may be performed on a first model of the input set 120 to generate an intermediate model, and the crossover operation 154 may be performed to combine aspects of the intermediate model with aspects of a second model of the input set 120 to generate a model of the output set 130.

During the mutation operation 152, a portion of a model may be randomly modified. The frequency of mutations may be based on a mutation probability metric, which may be user-defined or randomly selected/adjusted. To illustrate with reference to the model "encodings" described with respect to FIG. 1, the mutation operation 152 may include randomly "flipping" one or more bits of a bit string.

The mutation operation 152 may thus be a random or pseudo-random biological operator that generates or contributes to a model of the output set 130 by mutating any aspect of a model of the input set 120. For example, the mutation operation 152 may cause the topology of a particular model of the input set to be modified by addition or omission of one or more layers, by changing layer types of one or more layers, by changing a count of nodes of one or more layers, by changing a count of nodes of the latent-space layer, or a combination thereof. As another example, the mutation operation 152 may cause one or more activation functions, aggregation functions, bias values/functions, and/or or connection weights to be modified. In some implementations, rather than operating on a model of the input set 120, the mutation operation 152 may be performed on a model generated by the crossover operation 154. For example, the crossover operation 154 may combine aspects of two models of the input set 120 to generate an intermediate model, and the mutation operation 152 may be performed on the intermediate model to generate a model of the output set 130.

The genetic algorithm 110 may continue in the manner described above through multiple epochs. When the genetic algorithm 110 receives the trained autoencoder 162, the trained autoencoder 162 may be provided as part of the input set 120 of the next epoch, as shown in a seventh stage 800 of FIG. 8. For example, the trained autoencoder 162 may replace one of the other 200 models in the input set 120 or may be a 201' model of the input set (e.g., in some epochs, more than 200 models may be processed). During training by the optimization trainer 160, the genetic algorithm 110 may have advanced one or more epochs. Thus, when the trained autoencoder 162 is received, the trained autoencoder 162 may be inserted as input into an epoch subsequent to the epoch during which the corresponding trainable autoencoder 132 was provided to the optimization trainer 160. To illustrate, if the trainable autoencoder 132 was provided to the optimization trainer 160 during epoch N, then the trained autoencoder 162 may be input into epoch N+X, where X is an integer greater than zero.

Figure 8:
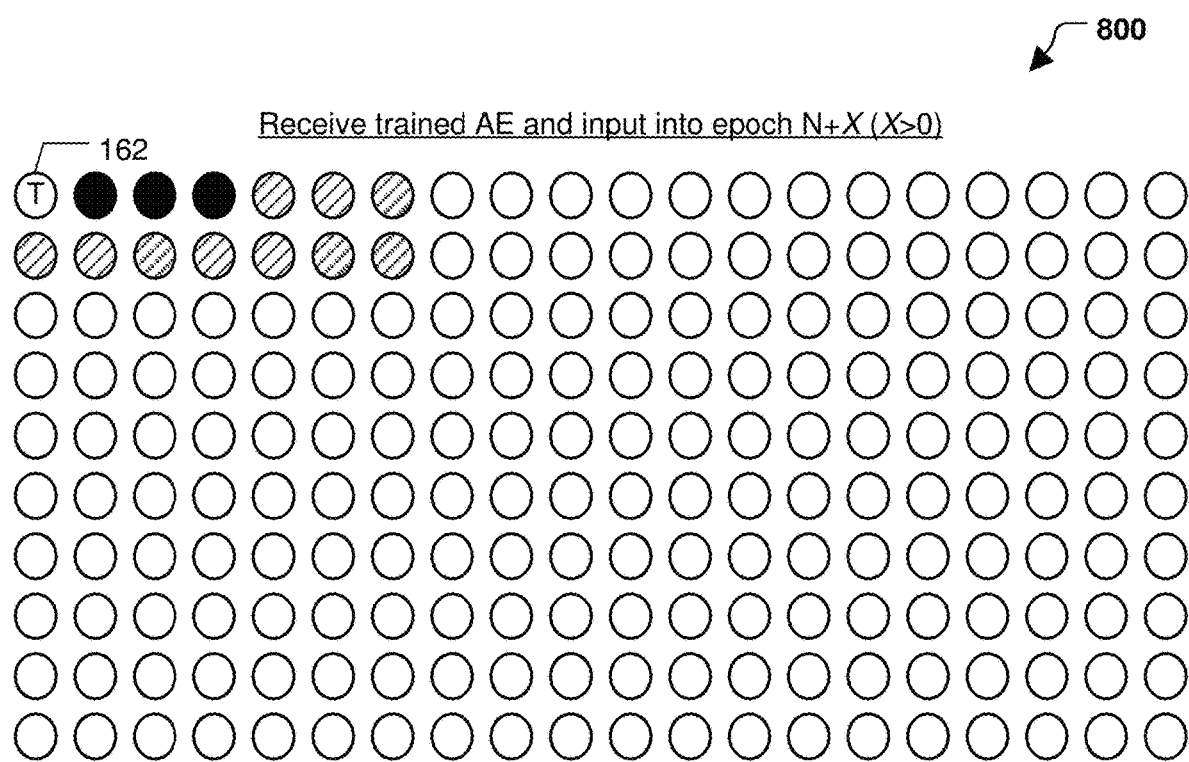
FIG. 8 illustrates a particular example of a seventh stage of operation at the system of FIG. 1.

In the example of FIGS. 6 and 8, a single trainable autoencoder 132 is provided to the optimization trainer 160 and a single trained autoencoder 162 is received from the optimization trainer 160. When the trained autoencoder 162 is received, the optimization trainer 160 becomes available to train another trainable autoencoder. Thus, because training takes more than one epoch, trained autoencoder 162 may be input into the genetic algorithm 110 sporadically rather than every epoch after the initial epoch. In some implementations, the optimization trainer 160 may have a queue or stack of trainable autoencoder 132 that are awaiting training. The genetic algorithm 110 may add trainable autoencoder 132 to the queue or stack as they are generated and the optimization trainer 160 may remove a trainable autoencoder 132 from the queue or stack at the start of a training cycle. In some implementations, the system 100 includes multiple optimization trainers 160 (e.g., executing on different devices, processors, cores, or threads). Each of the optimization trainers 160 may be configured to simultaneously train a different trainable autoencoder 132 to generate a different trained autoencoder 162. In such examples, more than one trainable autoencoder 132 may be generated during an epoch and/or more than one trained autoencoder 162 may be input into an epoch.

Operation at the system 100 may continue iteratively until specified a termination criterion, such as a time limit, a number of epochs, or a threshold fitness value (of an overall fittest model) is satisfied. When the termination criterion is satisfied, an overall fittest model of the last executed epoch may be selected and output as representing an autoencoder that is best able to distinguish the data representing a normal operational state from data representing an abnormal operational state. In some examples, the overall fittest model may undergo a final training operation (e.g., by the optimization trainer 160) before being output.

Performing genetic operations may be less resource intensive than evaluating fitness of models and training of models using backpropagation or other optimization techniques. For example, both evaluating the fitness of a model and training a model include providing input data to an autoencoder, calculating results of nodes and connections of the autoencoder to generate output data, and comparing the output data to the input data to calculate reconstruction loss. In contrast, genetic operations do not operate on the input data 102, but rather merely modify characteristics of one or more models. However, as described above, one iteration of the genetic algorithm 110 may include both genetic operations and evaluating the fitness of every model and species. Training trainable autoencoders generated by breeding the fittest models of an epoch may improve fitness of the trained autoencoders without requiring training of every model of an epoch. Further, the fitness of models of subsequent epochs may benefit from the improved fitness of the trained autoencoders due to genetic operations based on the trained autoencoders. Accordingly, training the fittest models enables generating a model with a particular error rate in fewer epochs than using genetic operations alone. As a result, fewer processing resources may be utilized in building highly accurate autoencoders based on a specified input data 102.

The system 100 of FIGS. 1 and 3 may thus support cooperative, data-driven execution of a genetic algorithm and optimization trainer to automatically arrive at an output autoencoder based on an input data set. The system 100 may arrive at the output autoencoder faster than using a genetic algorithm or backpropagation alone and with reduced cost as compared to hiring a data scientist. In some cases, the autoencoder output by the system 100 may also be more accurate (e.g., have better discrimination between normal and anomalous operational states) than an autoencoder generated by a genetic algorithm or backpropagation alone.

It will be appreciated that the systems and methods of the present disclosure may be applicable in various scenarios, infrastructures, and data environments. As an illustrative non-limiting example, the input data 102 may include timestamped data from a large array of sensors distributed around a wind farm and may also include timestamped uptime/downtime data of individual wind turbines. The system 100 may generate an autoencoder that is used to monitor real-time or delayed data from a wind turbine to detect anomalous operation which may be an indication of impending failure or a need for maintenance. Wind turbines are merely one example of devices that can be monitored. The system 100 can be used to generate an autoencoder to monitor data from any type of device that is associated with normal and abnormal (or anomalous) operational conditions.

Figure 9A:
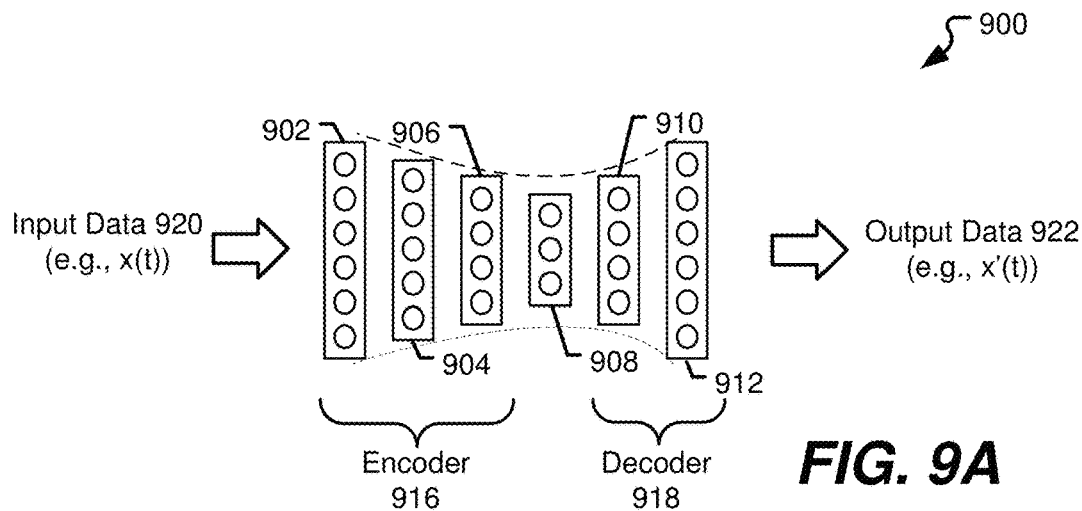
FIG. 9A illustrates an example of an autoencoder having a non-mirrored architecture.
Figure 9B:
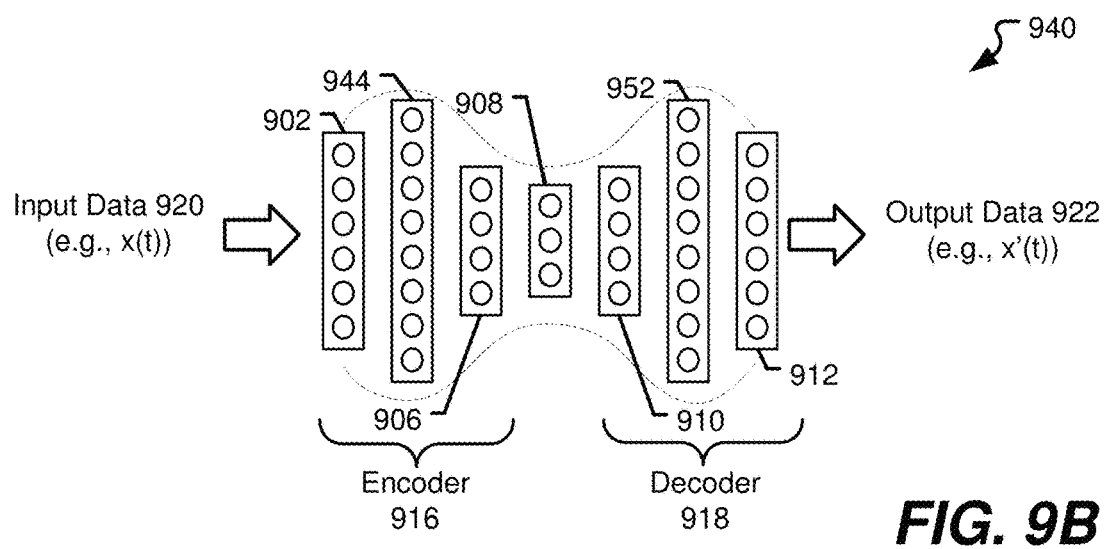
FIG. 9B illustrates an example of an autoencoder having a non-hourglass architecture.
Figure 9C:
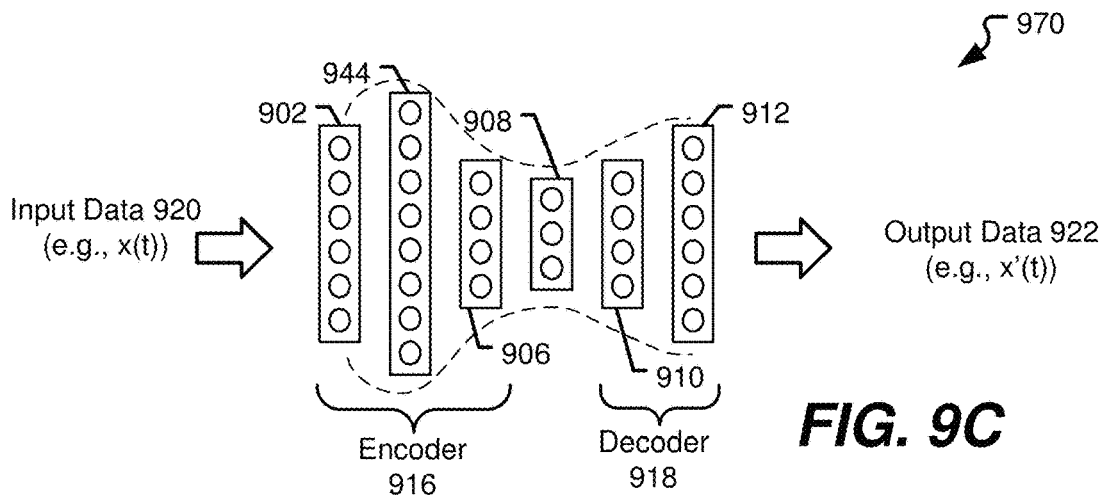
FIG. 9C illustrates an example of an autoencoder having a non-mirrored and non-hourglass architecture.

Historically, autoencoders have had an hourglass shape in which the encoder and decoder are mirror images of one another. While the system 100 of FIG. 1 can generate such autoencoders, the system 100 is also able to generate autoencoders with other architectures. FIGS. 9A, 9B, and 9C illustrate examples of autoencoders with various novel architectures that can be formed by the system 100 of FIG. 1 depending on user configuration settings or other limitation. In particular, FIG. 9A illustrates an autoencoder 900 having a non-mirrored architecture, FIG. 9B illustrates an autoencoder 940 having a non-hourglass architecture, and FIG. 9C illustrates an autoencoder 970 having a non-mirrored and non-hourglass architecture (also referred to herein as an "unconstrained" architecture). Each autoencoder 900, 940, 970 is depicted with dotted lines indicating the general shape of the autoencoder 900, 940, 970 when visualized as a set of layers or nodes to facilitate understanding of the architecture descriptor assigned to each.

Each of the autoencoder 900, 940, 970 is configured to receive input data 920 at an input layer 902 of an encoder, manipulate the input data 920 via one or more layers of the encoder 916, pass the manipulated date, via a latent-space layer 908 to a decoder 918, and generate output data 922 at an output layer 912 of the decoder 918. The encoder 916 provides a dimensionally reduced representation of the input data 920 to the latent-space layer 908, where the amount of dimensional reduction is based on a difference in size (e.g., count of nodes) between the input layer 902 and the latent-space layer 908. The decoder 918 attempts to recreate the input data 920 based on the dimensionally reduced data received from the latent-space layer 908. The more accurately the output data 922 recreates the input data 920, the lower the reconstruction loss of the autoencoder 900, 940, 970.

FIG. 9A illustrates an example of an autoencoder 900 in which the encoder 916 and the decoder 918 are not mirror images of one another. This type of architecture is referred to herein as a "non-mirrored" architecture. In the example illustrated in FIG. 9A, the encoder 916 includes three layers, including the input layer 902 and two hidden layers 904, 906. In contrast, the decoder 918 includes only two layers, including one hidden layer 910 and the output layer 912. Thus, a count of layers of the encoder 916 is greater than a count of layers of the decoder 918. Some tests of the system 100 have indicated that, when not constrained from doing so, the system 100 tends to generate autoencoders with more encoder layers than decoder layers. One possible explanation for this phenomenon is that some information provided to the encoder 916 is lost due to the dimensional reduction.

Accordingly, fewer layers are needed in an efficiently evolved decoder 918 to generate the output data 922.

Although FIG. 9A illustrates the non-mirrored architecture as having a different count of layers between the encoder 916 and the decoder 918, in other examples, an autoencoder having a non-mirrored architecture can have the same count of layers in the encoder 916 and the decoder 918 but with a different count of nodes between the encoder 916 and the decoder 918. For example, if the hidden layer 906 of FIG. 9A were omitted, then the encoder 916 would have two layers (i.e., the input layer 902 and the hidden layer 904), and the decoder 918 would have two layers (i.e., the hidden layer 910 and the output layer 912). Nevertheless, in this example, the autoencoder 900 would have a different count of nodes in the encoder 916 than in the decoder 918 because the hidden layer 904 has more nodes that the hidden layer 910.

FIG. 9B illustrates an example of an autoencoder 940 in which a count of nodes per layer has an inflection point between the input layer 902 and the latent-space layer 908. Stated another way, the count of nodes per layer does not monotonically decrease from the input layer 902 to the latent-space layer 908. Rather, one of the hidden layers 944 has more nodes than the layer adjacent to it on the input side (i.e., the input layer 902 in the example illustrated). This type of architecture is referred to herein as a "non-hourglass" architecture.

In an hourglass architecture, each layer of the encoder 916 has no more nodes than the layer adjacent to it on the input side (i.e., in the direction of the input layer 902), and each layer of the decoder 918 has no more nodes than the layer adjacent to it on the output side (i.e., in the direction of the output layer 912). Another way to say this is that the count of node per layer monotonically decreases in the encoder 916 and monotonically increases in the decoder 918. In a non-hourglass architecture either or both of these conditions can be violated. For example, the count of node per layer does not monotonically decrease in the encoder 916, the count of nodes per layer does not monotonically increase in the decoder 918, or both. In the example illustrated in FIG. 9B, the autoencoder 940 has a mirrored architecture since the encoder 916 is a mirror image of the decoder 918; thus, both conditions for an hourglass architecture are violated.

Although the example illustrated in FIG. 9B shows the hidden layer 944 having more nodes than the input layer 902, this is not required for non-hourglass architecture. For example, a non-hourglass architecture would be formed if the hidden layer 944 had four nodes and the hidden layer 906 had five nodes.

Some tests of the system 100 have indicated that, when not constrained from doing so, the system 100 generates some autoencoders with a non-hourglass architecture. At least some of these autoencoders perform well at differentiating normal from anomalous data. One possible explanation for this phenomenon is that the presence of one or more larger hidden layers (e.g., the hidden layer 944) provides useful convolution of the input data 920 before the dimensional reduction.

FIG. 9C illustrates an example of an autoencoder 970 having a non-mirrored and non-hourglass architecture. For example, the autoencoder 970 is similar to the autoencoder 940 save for the omission of hidden layer 952 of FIG. 9B, which results in the non-mirrored and non-hourglass architecture. The non-mirrored and non-hourglass architecture of the autoencoder 970 provides the advantage of both the non-mirrored architecture and the non-hourglass architecture described above. When not constrained from doing so, the system 100 often generates autoencoders with non-mirrored and non-hourglass architectures. Such autoencoders can achieve the discrimination task of low reconstruction loss for normal state data and high reconstruction loss for abnormal state data. Accordingly, such autoencoders are well suited for the task of equipment monitoring discussed below.

Figure 10:
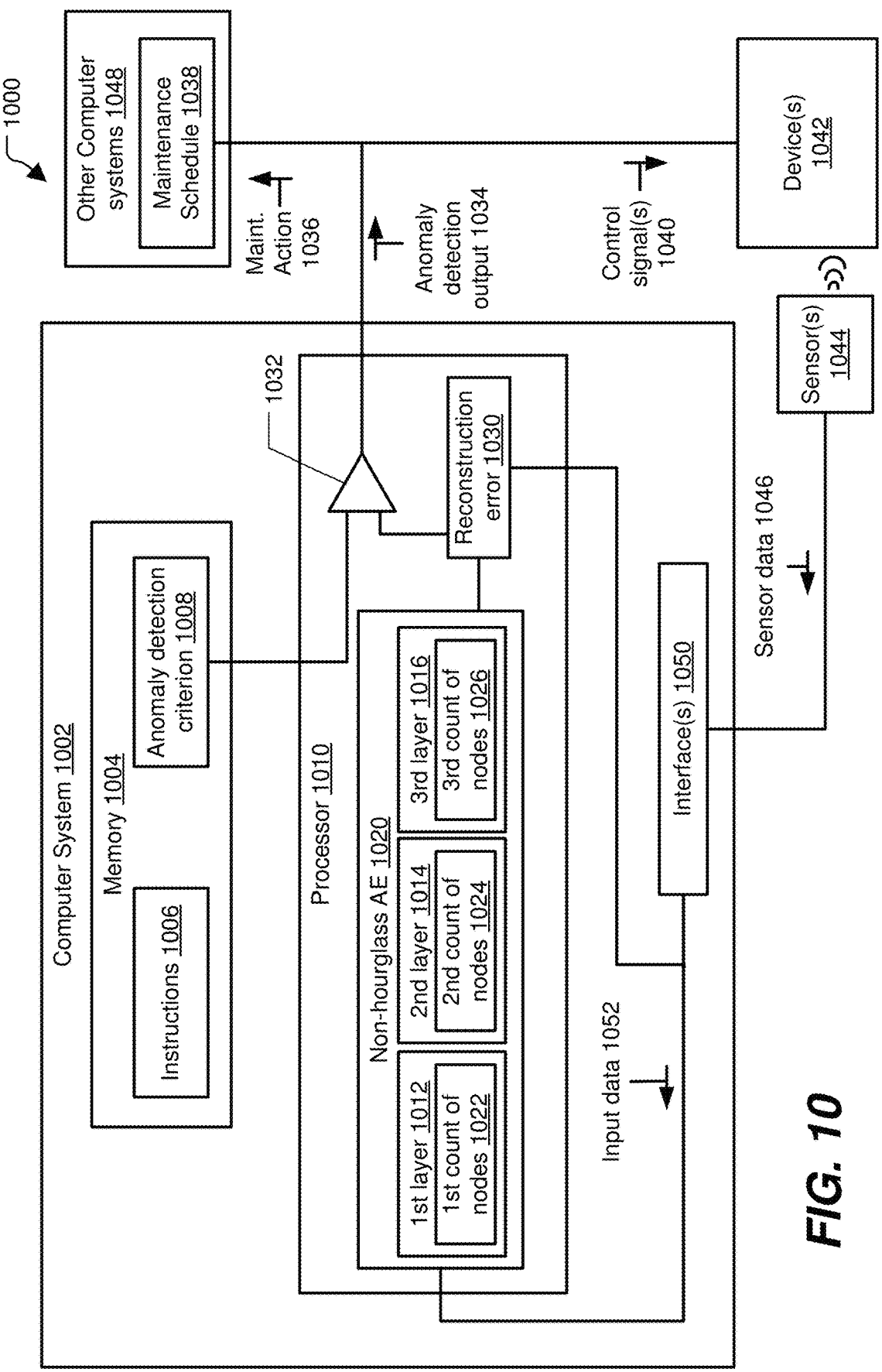
FIG. 10 illustrates an example of a system for using a non-hourglass autoencoder to monitor one or more devices for operational anomalies.
Figure 11:
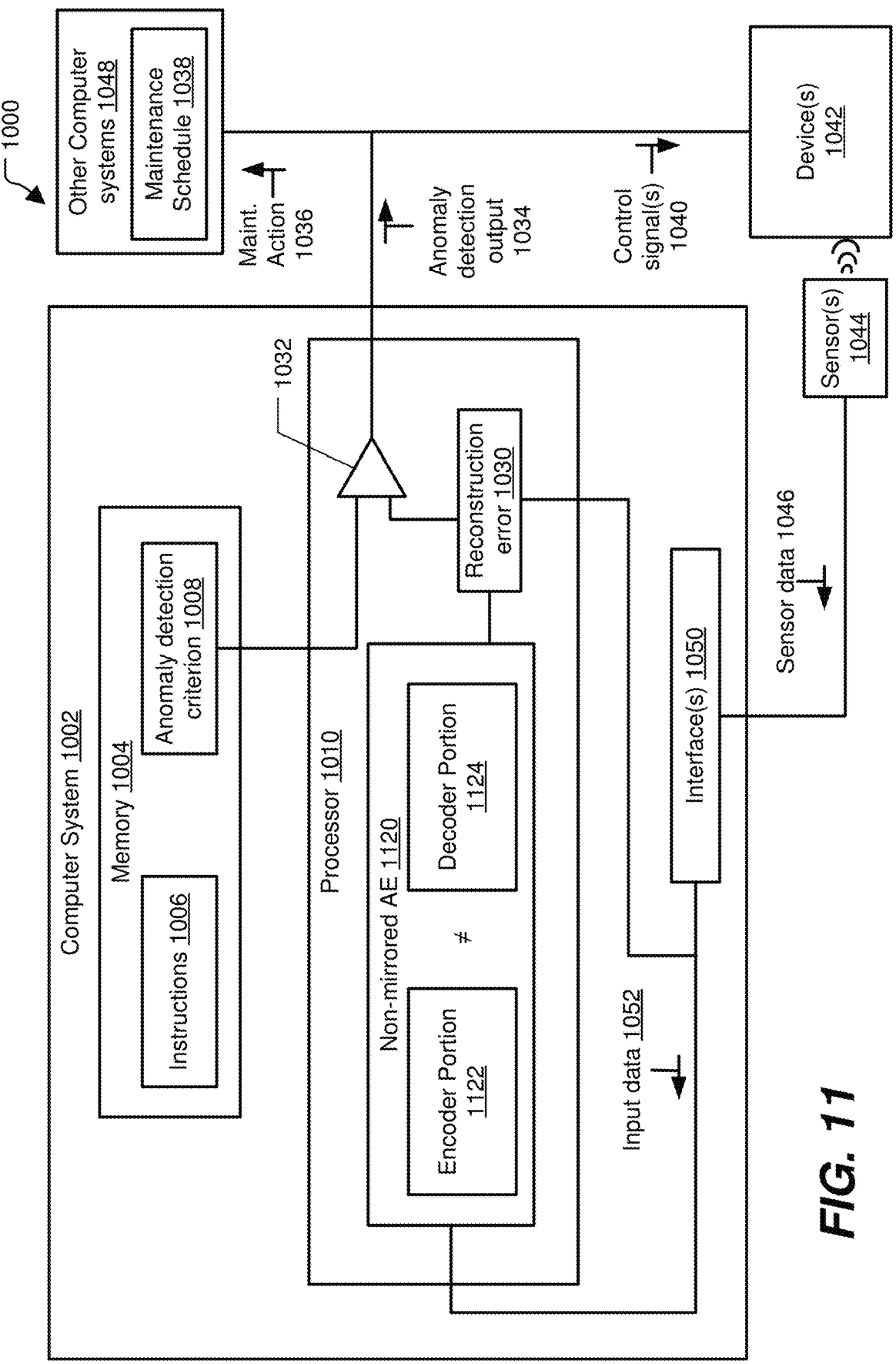
FIG. 11 illustrates an example of a system for using a non-mirrored autoencoder to monitor one or more devices for operational anomalies.

FIGS. 10 and 11 illustrate examples of a system 1000 for using an autoencoder to monitor one or more devices for operational anomalies. In the example illustrated in FIG. 10, the system 1000 uses a non-hourglass autoencoder 1020. In the example illustrated in FIG. 11, the system 1000 uses a non-mirrored autoencoder 1120. In some implementations, the non-hourglass autoencoder 1020, the non-mirrored autoencoder 1120, or both, are generated using the system 100 of FIG. 1.

The system 1000 includes a computer system 1002 including a processor 1010 and memory 1004. The memory 1004 stores instructions 1006 that are executable by the processor 1010 to monitor sensor data 1046 from one or more devices 1042 and to generate an anomaly detection output 1034 based on the sensor data 1046.

The computer system 1002 also includes one or more interface devices 1050 which are coupled to one or more sensors 1044, the device(s) 1042, one or more other computer devices (e.g., a computing device that stores a maintenance schedule 1038), or a combination thereof. In the examples illustrated in FIGS. 10 and 11, the interface(s) 1050 receive the sensor data 1046 (in real-time or delayed) from the sensor(s) 1044. The sensor data 1046 represents operational states of the device(s) 1042. For example, the sensor data 1046 can include temperature data, pressure data, rotation rate data, vibration data, power level data, or any other data that is indicative of the behavior or operational state of the device(s) 1042.

The interface(s) 1050 or the processor 1010 generate input data 1052 based on the sensor data 1046. For example, the input data 1052 can be identical to the sensor data 1046, or the input data 1052 can be generated by modifying the sensor data 1046. Examples of modifications that can be used to convert the sensor data 1046 into the input data 1052 include filling in missing data (e.g., by extrapolation), dropping some data, smoothing data, time synchronizing two or more sets of data that have different time signatures or sampling intervals, combining data with other information to generate new data (e.g., calculating a power value based on measured current and voltage values), etc.

The processor 1010 provides the input data 1052 to an autoencoder (e.g., the non-hourglass autoencoder 1020 of FIG. 10 or the non-mirrored autoencoder 1120 of FIG. 11). An encoder portion of the autoencoder 1020 or 1120 dimensionally reduces the input data 1052 to a latent space. A decoder portion of the autoencoder 1020 or 1120 then attempts to recreate the input data using the dimensionally reduced data. Output data from the decoder side is compared to the input data 1052 to determine reconstruction error 1030. A comparator 1032 compares the reconstruction error 1030 to an anomaly detection criterion 1008 to determine whether the sensor data 1046 corresponds to an anomalous or abnormal operational state of the device(s) 1042. The comparator 1032 generates the anomaly detection output 1034 when the reconstruction error 1030 satisfies the anomaly detection criterion 1008. In a particular example, the anomaly detection criterion 1008 is satisfied when the reconstruction error 1030 is greater than a threshold specified by the anomaly detection criterion 1008. In another particular example, the anomaly detection criterion 1008 is satisfied when an aggregate or average value of the reconstruction error 1030 is greater than a threshold specified by the anomaly detection criterion 1008. Other anomaly detection criteria 1008 can also, or in the alternative, be used.

Generally, the reconstruction error 1030 is relatively low in response to the sensor data 1046 representing normal operational states of the device(s) 1042 and is relatively high in response to the sensor data 1046 representing anomalous or abnormal operational states of the device(s) 1042. For example, when the autoencoder 1020 or 1120 is generated using the system 100, the cooperative use of the genetic algorithm 110 with the first portion 104 of the input data 102 and the optimization trainer 160 with the second portion 106 of the input data 102 ensures that the autoencoder 1020 or 1120 has a wide range for reconstruction errors 1030 depending on whether the sensor data 1046 represent normal or abnormal operational states of the device(s) 1042.

The anomaly detection output 1034 can be sent to another device, such one or more other computers systems 1048, to the device(s) 1042, etc. For example, when the other computer system(s) 1048 stores or maintains a maintenance schedule 1038 for the device(s) 1042, the anomaly detection output 1034 can include or correspond to a maintenance action instruction 1036 that causes the other computer system(s) 1048 to update the maintenance schedule 1038 to schedule maintenance for the device(s) 1042. As another example, the anomaly detection output 1034 can include or correspond to a control signal 1040 that is provided to the device(s) 1042 or to a control or control system associated with the device(s) 1042 to change operation of the device(s) 1042. For example, the control signal 1040 may cause the device(s) 1042 to shut down, to change one or more operational parameters, to restart or reset, etc.

In FIG. 10, the non-hourglass autoencoder 1020 includes a plurality of layers, including a first layer 1012 having a first count of nodes 1022, a second layer 1014 having a second count of nodes 1024, and a third layer 1016 having a third count of nodes 1026. The first, second, and third layers 1012, 1214, 1016 are adjacent to one another in either the encoder portion of the non-hourglass autoencoder 1020 or the decoder portion of the non-hourglass autoencoder 1020. If the first, second, and third layers 1012, 1214, 1016 are in the encoder portion of the non-hourglass autoencoder 1020, the second count of nodes 1024 is greater than the first count of nodes 1022. For example, as illustrated in FIG. 9B, the first layer 1012 may correspond to the input layer 902, the second layer 1014 may correspond to the first hidden layer 944, and the third layer 1016 may correspond to the second hidden layer 906. If the first, second, and third layers 1012, 1214, 1016 are in the decoder portion of the non-hourglass autoencoder 1020, the second count of nodes 1024 is greater than the third count of nodes 1026. For example, as illustrated in FIG. 9B, the first layer 1012 may correspond to the hidden layer 910, the second layer 1014 may correspond to the hidden layer 952, and the third layer 1016 may correspond to the output layer 912.

Thus, the second layer 1014 is a hidden layer that has more nodes than would be present in an hourglass architecture. The additional nodes of this hidden layer provide useful convolution of the data being processed which improves discrimination between sensor data 1046 representing normal and abnormal operational states of the device(s) 1042. For example, the additional data convolution provided by the second layer 1014 may decrease reconstruction error 1030 associated with sensor data 1046 representing normal operational states of the device(s) 1042, may increase reconstruction error 1030 associated with sensor data 1046 representing abnormal operational states of the device(s) 1042, or both.

In FIG. 11, the non-mirrored autoencoder 1120 includes an encoder portion 1122 and a decoder portion 1124, and the encoder portion 1122 and decoder portion 1124 are not mirror images of one another. For example, as illustrated in FIG. 9A, the encoder portion 1122 may correspond to the encoder 916, and the decoder portion 1124 may correspond to the decoder 918. In this example, a count of layers of encoder portion 1122 is not equal to a count of layers of the decoder portion 1124. In other examples, the encoder portion 1122 and decoder portion 1124 differ in other ways, such as different count of nodes of one or more layers of the encoder portion 1122 than the count of nodes of a corresponding layer of the decoder portion 1124. As another example, corresponding layers of the encoder portion 1122 and decoder portion 1124 may have different layer types. To illustrate, a first hidden layer of the encoder portion 1122 may be an LSTM layer type whereas a last hidden layer of the decoder portion 1124 may be a fully connected layer type.

In some implementations, the non-mirrored architecture of the encoder portion 1122 and the decoder portion 1124 improves discrimination between sensor data 1046 representing normal and abnormal operational states of the device(s) 1042. Additionally, or in the alternative, the non-mirrored architecture of the encoder portion 1122 and the decoder portion 1124 may reduce computational complexity of generating output data based on the input data 1052. For example, since some information is lost as a result of the dimensional reduction performed by the encoder portion 1122, the decoder portion 1124 may be able to use fewer nodes or fewer layers to generate the output data. Since calculations associated with each node or layer require processing resources and memory, reducing the number of nodes or layers in the decoder portion 1124 relative to the encoder portion 1122 conserves computing resources.

Figure 12:
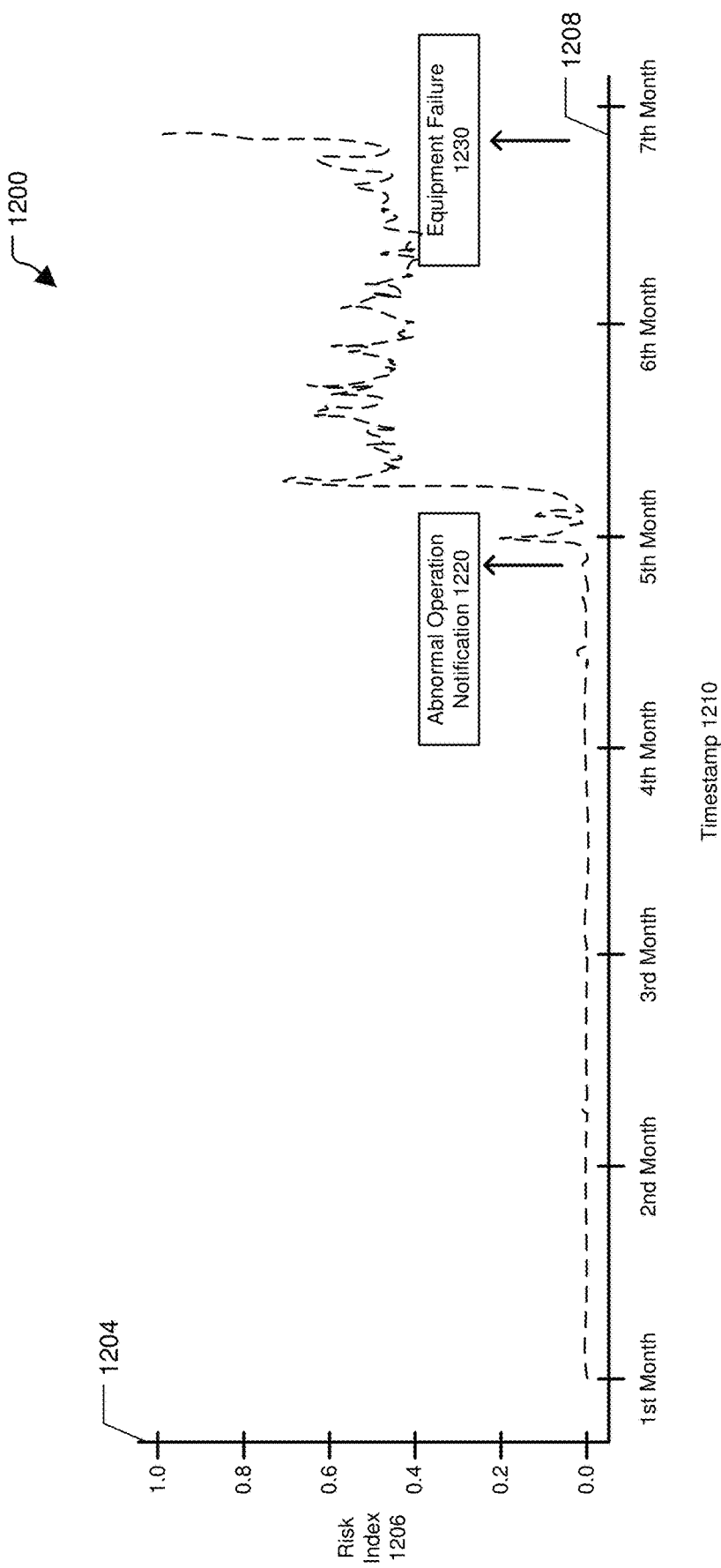
FIG. 12 illustrates an example of output data generated by an autoencoder monitoring one or more devices.

FIG. 12 illustrates a graph 1200 of output data generated by an unconstrained autoencoder monitoring one or more devices. The unconstrained autoencoder used to generate the output data was generated using the system 100 of FIG. 1 without constraining the system 100 from producing non-mirrored and non-hourglass architectures. In FIG. 12, the ordinate 1204 represents values of a risk index 1206, which is based on or corresponds to the reconstruction error 1030 of FIGS. 10 and 11, and the abscissa 1208 represents time/date stamps 1210 of sensor data. Overall, the graph 1200 in FIG. 12 represents a seven-month period and is based on historical sensor data collected from industrial equipment that suffered a known fault.

As is clear from FIG. 12, during the first four months the risk index value changed little (though occasional blips are present representing transient changes in operational states of the monitored equipment). However, just before the fifth month, there is a significant change in the risk index indicating that the reconstruction error 1030 of the autoencoder increased. The increase was sufficient to satisfy the anomaly detection criteria 1008, and an abnormal operation notification 1220 was generated. The abnormal operation notification 1220 is a type of the anomaly detection output 1034 of FIGS. 10 and 11. Subsequently, the monitored equipment suffered equipment failure 1230 just before the end of the sixth month. Thus, in this specific example, monitoring the equipment in real-time using the autoencoder would have provided notice of anomalous behavior of the equipment approximately two months before the equipment failure 1230. Having such advance notice would have enable the equipment operator to schedule maintenance, order parts, perform diagnostics, modify operation of the equipment, or take other steps to avoid or mitigate the impact of the equipment failure 1230.

Figure 13A:
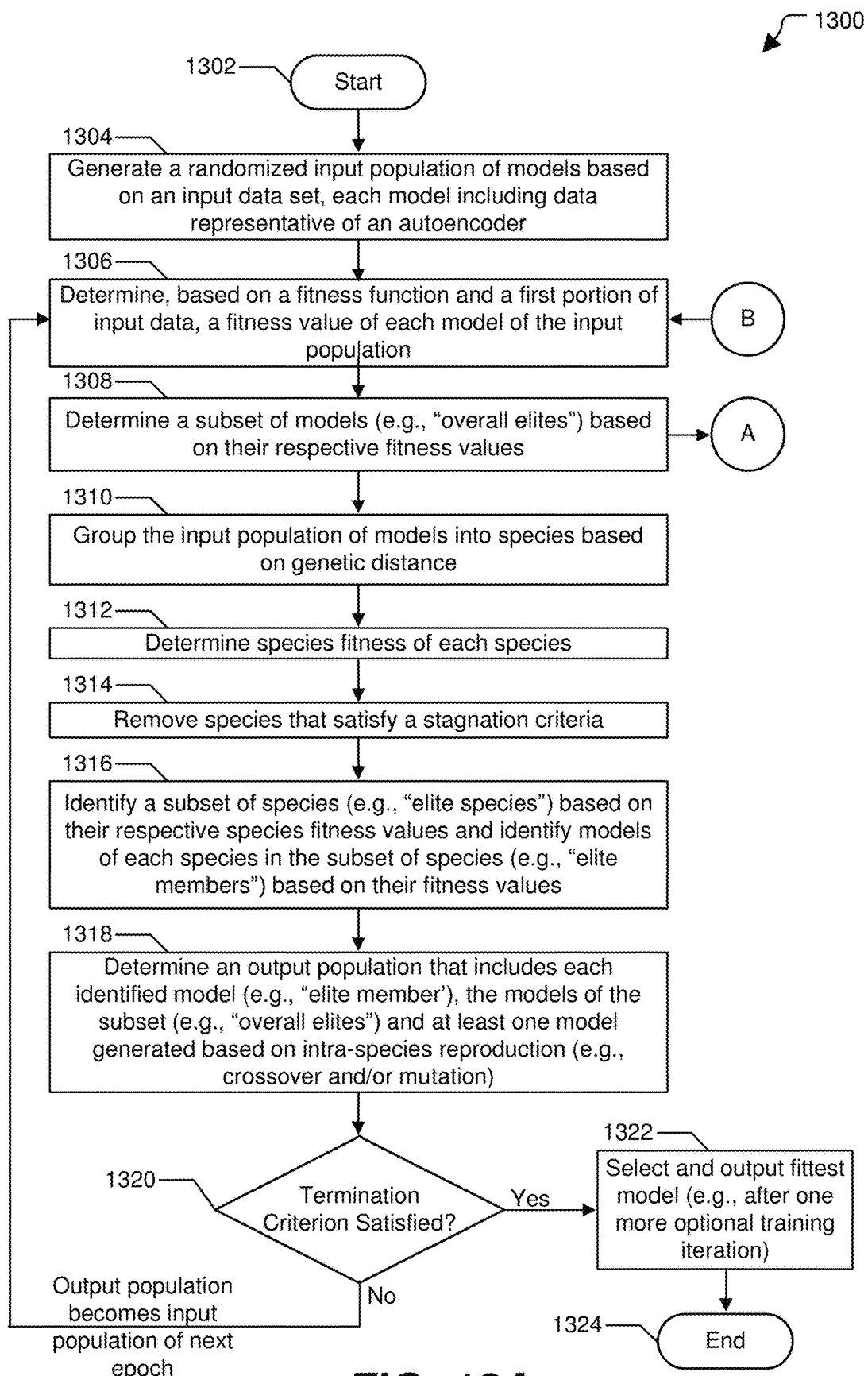
FIGS. 13A and 13B collectively illustrate an example of a method of cooperative execution of a genetic algorithm and an optimization trainer to generate an autoencoder.
Figure 13B:
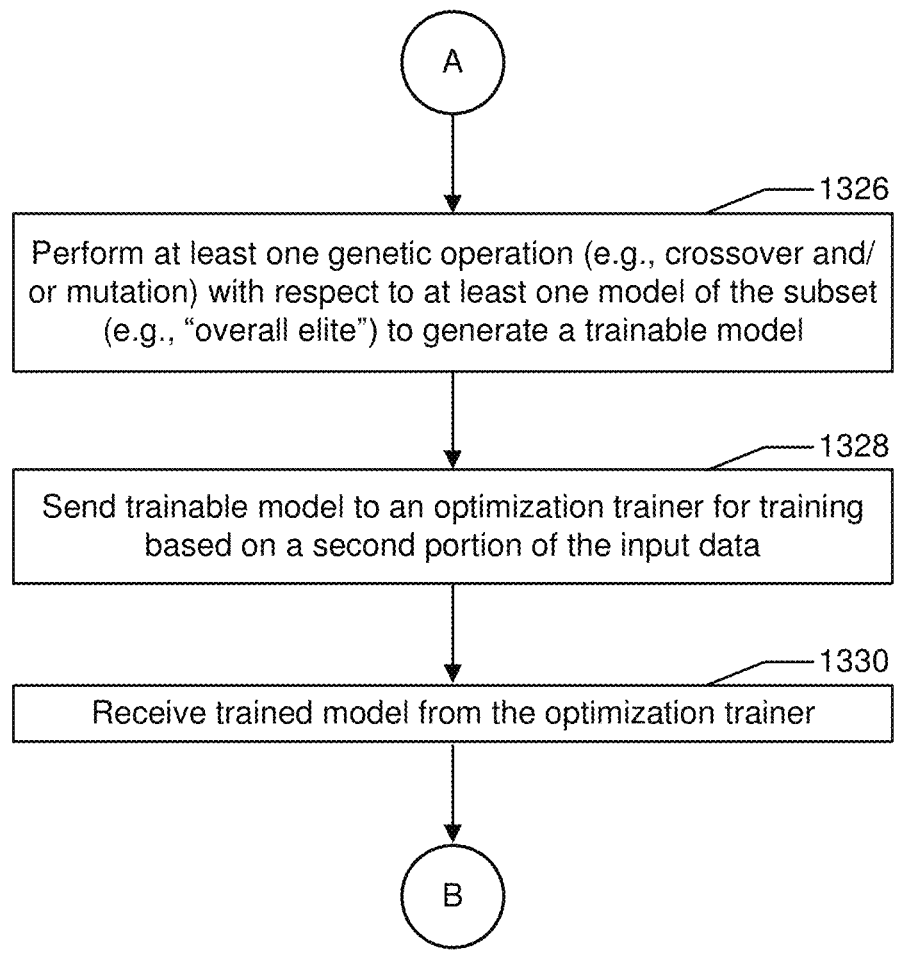

FIGS. 13A and 13B depict a particular example of a method 1300 of cooperative execution of a genetic algorithm and an optimization trainer. In an illustrative example, the method 1300 may be performed at the system 100 of FIG. 1.

The method 1300 may start, at 1302, and may include generating a randomized input population of models based on an input data set, at 1304. Each model may include data representative of an autoencoder. For example, each model may specify an autoencoder as described with reference to FIG. 2. Further, each of the models may be part of the input set 120 of FIG. 1.

The method 1300 may also include determining, based on a fitness function, a fitness value of each model of the input population, at 1306. For example, the fitness of each model of the input set 120 may be determined based on the first portion 104 of the input data 102, as described with reference to FIGS. 1 and 3.

The method 1300 may further include determining a subset of models based on their respective fitness values, at 1308. The subset of models may be the fittest models of the input population, e.g., "overall elites." For example, "overall elites" may be determined as described with reference to FIG. 5.

The method 1300 may include performing multiple sets of operations at least partially concurrently. Continuing to 1326 (in FIG. 13B), the method 1300 may include performing at least one genetic operation with respect to at least one model of the subset to generate a trainable autoencoder. For example, the crossover operation 154, the mutation operation 152, or both, may be performed with respect to the "overall elites" to generate the trainable autoencoder 132, as described with reference to FIGS. 1 and 6.

The method 1300 may also include sending the trainable model to an optimization trainer (e.g., a backpropagation trainer) for training based on a second portion of the input data, at 1328. For example, the optimization trainer 160 of FIG. 1 may train the trainable autoencoder 122 based on the second portion 106 of the input data 102 to generate the trained autoencoder 162, as described with reference to FIGS. 1, 3 and 6.

Returning to FIG. 13A, the genetic algorithm may continue while optimization training occurs. For example, the method 1300 may include grouping the input population of models into species based on genetic distance, at 1310, and determining species fitness of each species, at 1312. To illustrate, the models of the input set 120 may be grouped into species and species fitness may be evaluated as described with reference to FIGS. 4 and 5.

Continuing to 1314, species that satisfy a stagnation criterion may be removed. At 1316, the method 1300 may include identifying a subset of species based on their respective fitness values and identifying models of each species in the subset based on their respective model fitness values. The subset of species may be the fittest species of the input population, e.g., "elite species," and the identified models of the "elite species" may be the fittest members of those species, e.g., "elite members." For example, species fitness values, "elite species," and "elite members" may be determined as described with reference to FIG. 5.

The method 1300 may include determining an output population that includes each "elite member," the "overall elites," and at least one model that is generated based on intra-species reproduction, at 1318. For example, the models of the output set 130 of FIG. 1 may be determined, where the output set 130 includes the overall elite models 560-564, the elite members (including the elite member model 570), and at least one model generated based on intra-species reproduction using the crossover operation 154 and/or the mutation operation 152, as described with reference to FIGS. 1 and 7.

The method 1300 may include determining whether a termination criterion is satisfied, at 1320. The termination criterion may include a time limit, a number of epochs, or a threshold fitness value of an overall fittest model, as illustrative non-limiting examples. If the termination criterion is not satisfied, the method 1300 returns to 1306 and a next epoch of the genetic algorithm is executed, where the output population determined at 1318 is the input population of the next epoch.

As described above, while the genetic algorithm is ongoing, the optimization trainer may train the trainable autoencoder to generate a trained autoencoder. When training is complete, the method 1300 may include receiving the trained autoencoder from the optimization trainer, at 1330 (in FIG. 13B). The trained autoencoder may be added to the input set of an epoch of the genetic algorithm, as shown in FIG. 13B.

When the termination criterion is satisfied, at 1320, the method 1300 may include selecting and outputting a fittest model, at 1322, and the method 1300 may end, at 1324. In some implementations, the selected model may be subjected to a final training operation, e.g., by the optimization trainer or by another trainer, before being output.

It is to be understood that the division and ordering of steps in FIGS. 13A and 13B is for illustrative purposes only and is not to be considered limiting. In alternative implementations, certain steps may be combined and other steps may be subdivided into multiple steps. Moreover, the ordering of steps may change. For example, the termination criterion may be evaluated after determining the "overall elites," at 1308, rather than after determining the output population, at 1318.

Figure 14:
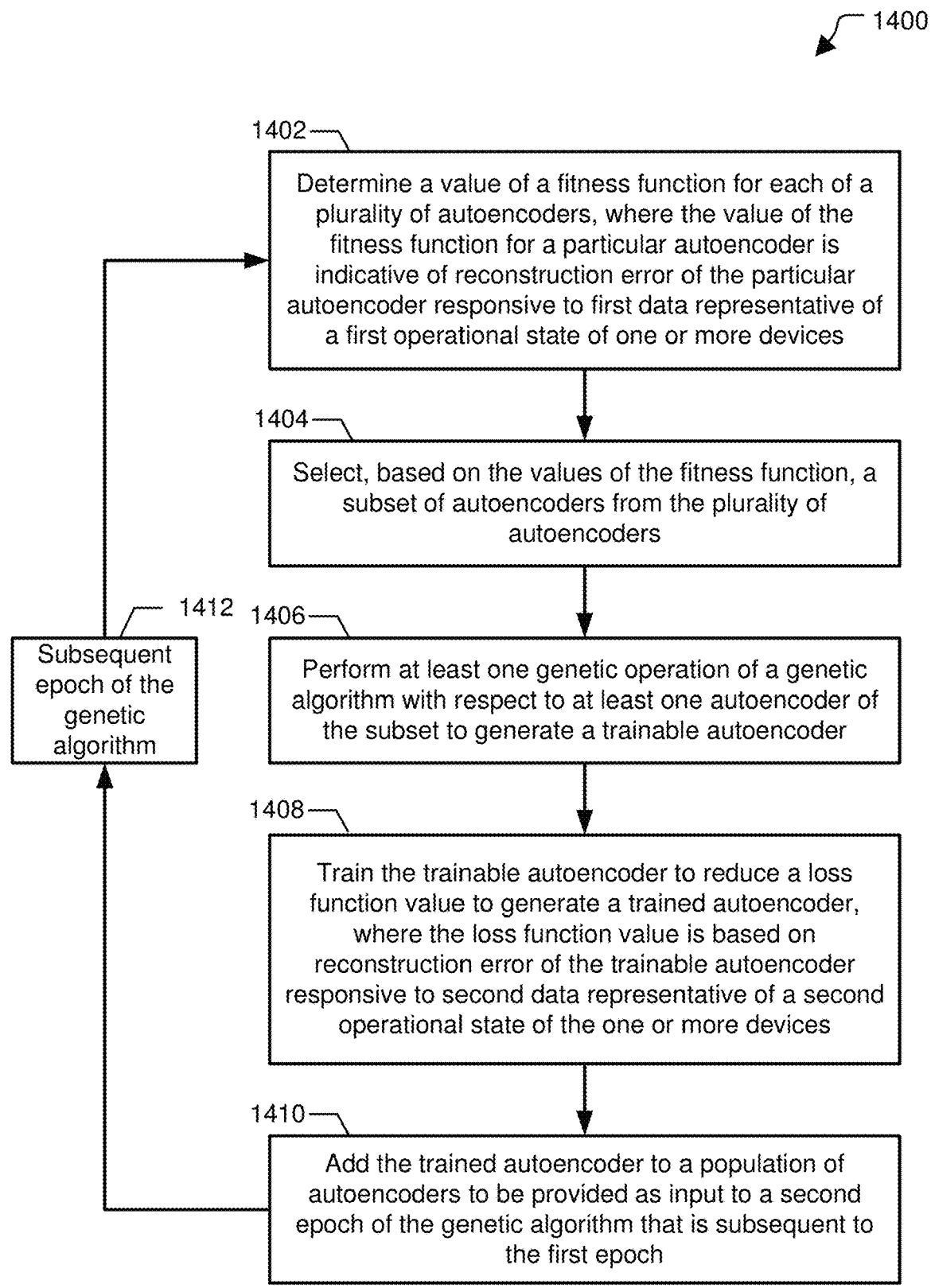
FIG. 14 illustrates another example of a method of cooperative execution of a genetic algorithm and an optimization trainer to generate an autoencoder.

FIG. 14 illustrates another example of a method 1400 of cooperative execution of a genetic algorithm and an optimization trainer to generate an autoencoder. In particular, the method 1400 illustrates operations performed during execution of a first epoch of a genetic algorithm. The first epoch can be the initial epoch of the genetic algorithm, or the first epoch can be an epoch after the initial epoch of the genetic algorithm.

The method 1400 includes, at 1402, determining a value of a fitness function for each of a plurality of autoencoders. The value of the fitness function for a particular autoencoder is indicative of reconstruction error of the particular autoencoder responsive to first data representative of a first operational state of one or more devices. For example, the system 100 of FIG. 1 or 3 can determine the fitness function values 144 based on the fitness function 142 and the first portion 104 of the input data 102. The value of the fitness function 142 for a particular autoencoder 134 is based on the reconstruction loss 316 (also referred to herein as "reconstruction error") of the autoencoder 134.

The method 1400 also includes, at 1404, selecting, based on the values of the fitness function, a subset of autoencoders from the plurality of autoencoders. For example, the selection operation 318 can select one or more autoencoders 134 based on the values of the fitness functions (e.g., based on the reconstruction loss 316 of each autoencoders of the input set 120). In a particular implementation, the selection operation 318 preferentially selects autoencoders of the input set 120 that have higher reconstruction loss 316 than other autoencoders of the input set 120.

The method 1400 further includes, at 1406, performing at least one genetic operation of the genetic algorithm with respect to at least one autoencoder of the subset to generate a trainable autoencoder. For example, one or more of the evolutionary operations 150 can be performed on autoencoders of the subset, such as a mutation operation 152, a crossover operation 154, or both. In some implementations, an extinction operation 156 can be performed on one or more autoencoders of the subset. In such implementations, the autoencoders subjected to extinction are selected from among the autoencoders of the input set 120 that have lower reconstruction loss 316.

The method 1400 also includes, at 1408, training the trainable autoencoder to reduce a loss function value to generate a trained autoencoder. The loss function value is based on reconstruction error of the trainable autoencoder responsive to second data representative of a second operational state of the one or more devices. For example, the system 100 of FIG. 1 or 3 may provide the trainable autoencoder 132 to the optimization trainer 160 which may adjust connection link weights of the trainable autoencoder such that reconstruction loss 336 of the trainable autoencoder 132 responsive to the second portion 106 of the input data 102 is reduced.

The method 1400 includes, at 1410, adding the trained autoencoder to a population of autoencoders to be provided as input to a second epoch of the genetic algorithm that is subsequent to the first epoch, and at 1412, initiating or performing the second epoch of the genetic algorithm.

In some implementations, the method 1400 is a subset or type of the method 1300. For example, although the method 1400 does not specifically explain the details of speciation and selecting elite species, the steps of the method 1400 include such operations in some implementation. Further, although the method 1400 does not specifically illustrate a termination criterion, the method 1400 includes a termination decision to end the method and output at least one autoencoder. The termination decision can be disposed between any two operations of the method 1400, or the termination decision can be evaluated multiple times during each epoch, such as after every operation of the method 1400 or after every operation that could change the termination decision, such as each time the fitness of any autoencoder is evaluated.

Figure 15:
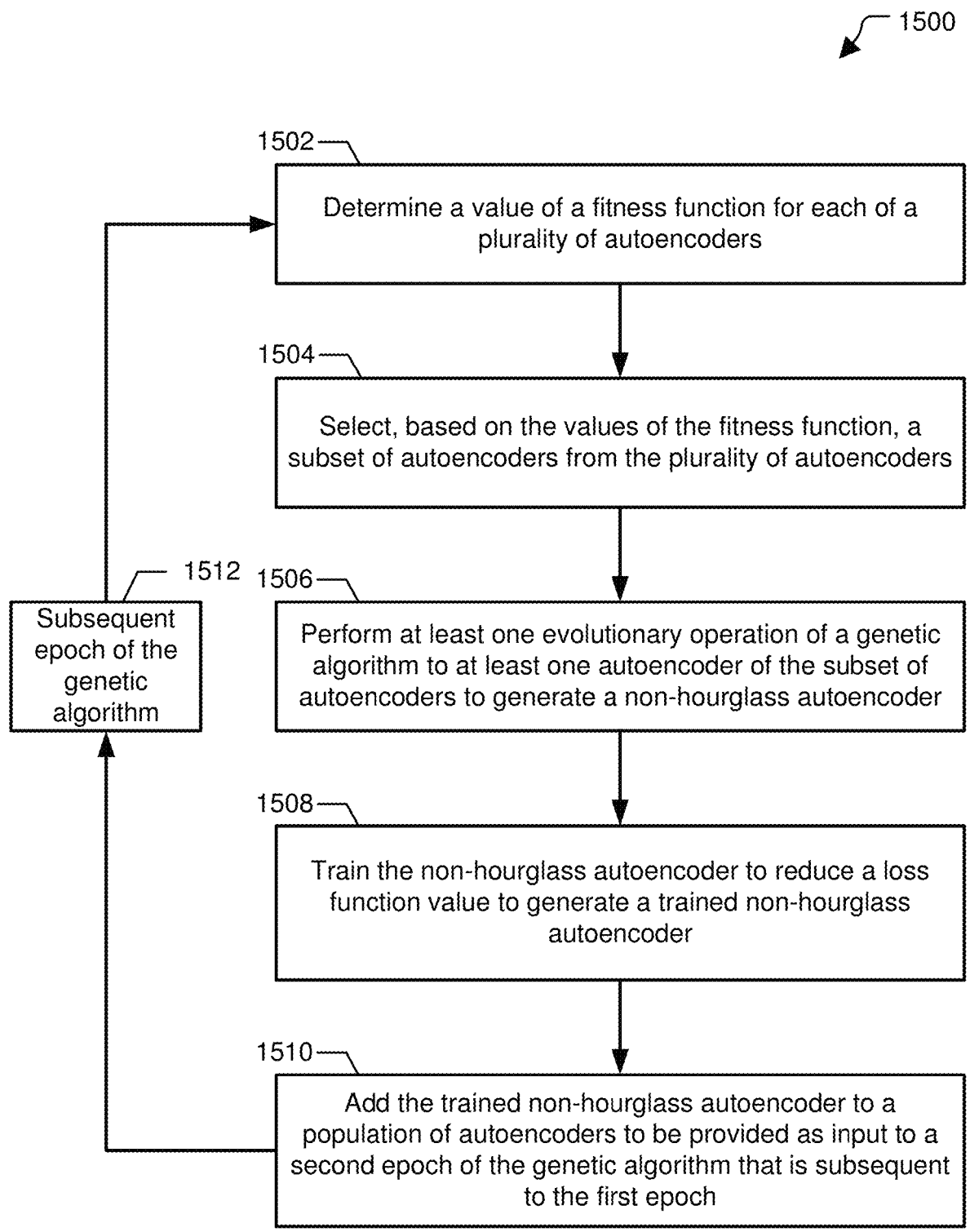
FIG. 15 illustrates another example of a method of cooperative execution of a genetic algorithm and an optimization trainer to generate a non-hourglass autoencoder.

FIG. 15 illustrates another example of a method of cooperative execution of a genetic algorithm and an optimization trainer to generate a non-hourglass autoencoder. In particular, the method 1500 illustrates operations performed during execution of a first epoch of a genetic algorithm. The first epoch can be the initial epoch of the genetic algorithm, or the first epoch can be an epoch after the initial epoch of the genetic algorithm. The method 1500 is a special case of the method 1400 in which the system 100 is not constrained from generating non-hourglass architectures. For example, the system 100 may perform the method 1500 when a user configuration option is selected to enable generation of non-hourglass architectures.

The method 1500 includes, at 1502, determining a value of a fitness function for each of a plurality of autoencoders. The value of the fitness function for a particular autoencoder is indicative of reconstruction error of the particular autoencoder responsive to first data representative of a first operational state of one or more devices. For example, the system 100 of FIG. 1 or 3 can determine the fitness function values 144 based on the fitness function 142 and the first portion 104 of the input data 102. The value of the fitness function 142 for a particular autoencoder 134 is based on the reconstruction loss 316 (also referred to herein as "reconstruction error") of the autoencoder 134.

The method 1500 also includes, at 1504, selecting, based on the values of the fitness function, a subset of autoencoders from the plurality of autoencoders. For example, the selection operation 318 can select one or more autoencoders 134 based on the values of the fitness functions (e.g., based on the reconstruction loss 316 of each autoencoders of the input set 120). In a particular implementation, the selection operation 318 preferentially selects autoencoders of the input set 120 that have higher reconstruction loss 316 than other autoencoders of the input set 120.

The method 1500 further includes, at 1506, performing at least one evolutionary operation to at least one autoencoders of the subset of autoencoders to generate a non-hourglass autoencoder. The non-hourglass autoencoder has a network architecture including at least a first layer having a first count of nodes, a second layer having a second count of nodes, and a third layer having a third count of nodes, where the second layer is disposed between the first layer and the third layer, and the second count of nodes is greater than the first count of nodes and the second count of nodes is greater than the third count of nodes. For example, the non-hourglass autoencoder can have one of the architectures described with reference to FIG. 9B, 9C or 10.

The method 1500 includes, at 1508, training the non-hourglass autoencoder to reduce a loss function value to generate a trained non-hourglass autoencoder. The loss function value is based on reconstruction error of the trainable non-hourglass autoencoder responsive to second data representative of a second operational state of the one or more devices. For example, the system 100 of FIG. 1 or 3 may provide the trainable autoencoder 132 (which for the method 1500 is a non-hourglass autoencoder) to the optimization trainer 160 which may adjust connection link weights of the trainable autoencoder such that reconstruction loss 336 of the trainable autoencoder 132 responsive to the second portion 106 of the input data 102 is reduced.

The method 1500 also includes, at 1510, adding the trained non-hourglass autoencoder to a population of autoencoders to be provided as input to a second epoch of the genetic algorithm that is subsequent to the first epoch, and at 1512, initiating or performing the second epoch of the genetic algorithm.

In some implementations, the method 1500 is a subset or type of the method 1300. For example, although the method 1500 does not specifically explain the details of speciation and selecting elite species, the steps of the method 1500 include such operations in some implementation. Further, although the method 1500 does not specifically illustrate a termination criterion, the method 1500 includes a termination decision to end the method and output at least one autoencoder. The termination decision can be disposed between any two operations of the method 1500, or the termination decision can be evaluated multiple times during each epoch, such as after every operation of the method 1500 or after every operation that could change the termination decision, such as each time the fitness of any autoencoder is evaluated.

Figure 16:
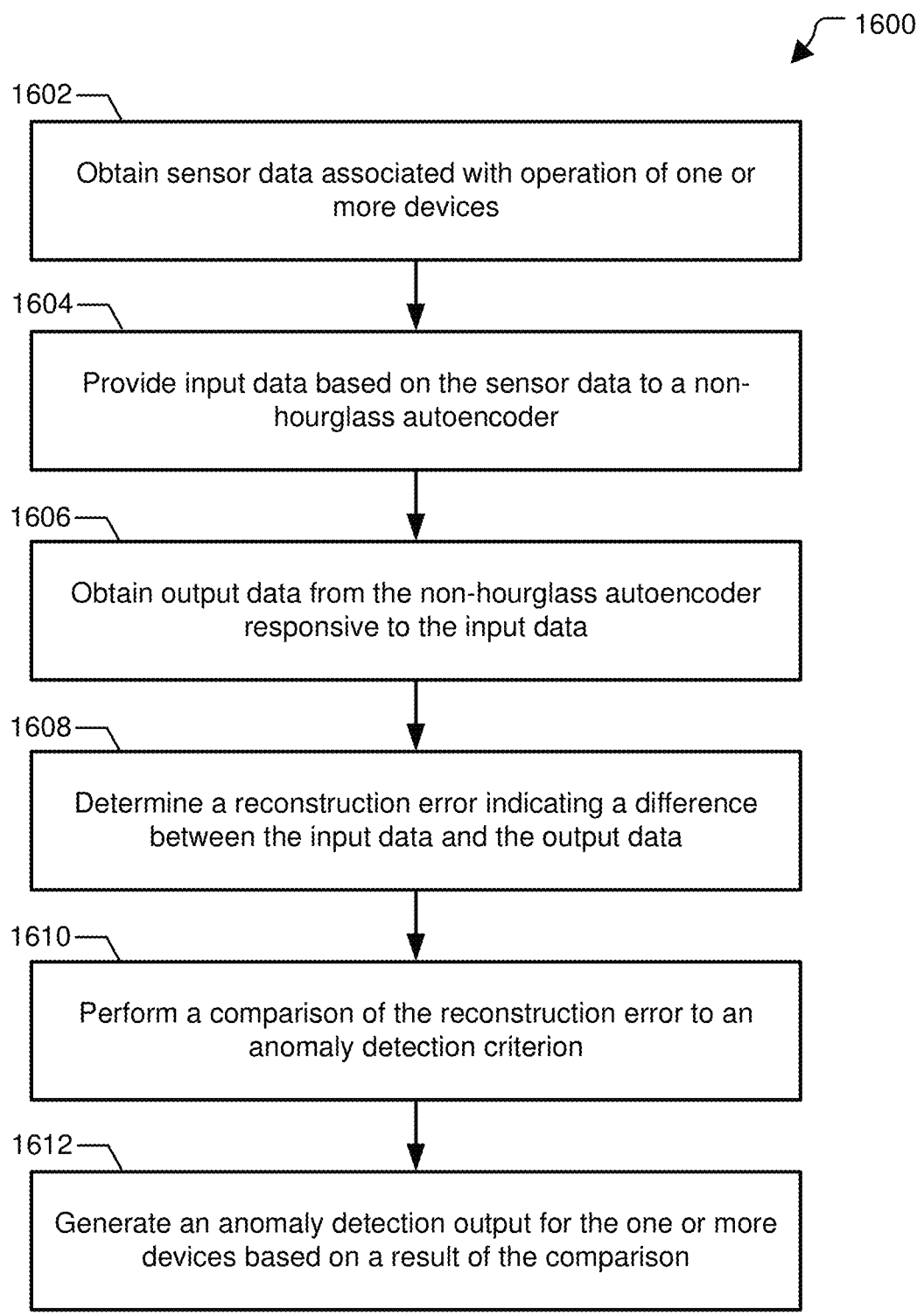
FIG. 16 illustrates an example of a method of using a non-hourglass autoencoder to monitor one or more devices for operational anomalies.

FIG. 16 illustrates an example of a method of using a non-hourglass autoencoder to monitor one or more devices for operational anomalies. For example, the method 1600 may be performed by the computer system 1002 or the processor 1010 of the system 1000 of FIG. 10. As explained above, using a non-hourglass autoencoder may improve (relative to an hourglass autoencoder) discrimination between normal and anomalous operation of the device(s).

The method 1600 includes, at 1602, obtaining sensor data associated with operation of one or more devices. For example, the interface(s) 1050 can obtain the sensor data 1046 from the sensor(s) 1044 associated with the device(s) 1042. In this example, the sensor data 1046 is indicative of operation of the device(s) 1042. The sensor data 1046 can be obtained directly from the sensor(s) 1044 (e.g., in real-time) or the sensor data 1046 can be pre-processed or stored in a memory (not shown) and subsequently obtained by the interface(s) 1050 (e.g., by reading a memory location storing the sensor data 1046).

The method 1600 includes, at 1604, providing input data based on the sensor data to a non-hourglass autoencoder. The non-hourglass autoencoder has a network architecture including at least a first layer having a first count of nodes, a second layer having a second count of nodes, and a third layer having a third count of nodes, where the second layer is disposed between the first layer and the third layer, and the second count of nodes is greater than the first count of nodes and the second count of nodes is greater than the third count of nodes. For example, the non-hourglass autoencoder can have one of the architectures described with reference to FIG. 9B, 9C or 10.

The method 1600 includes, at 1606, obtaining output data from the non-hourglass autoencoder responsive to the input data, and at 1608, determining a reconstruction error indicating a difference between the input data and the output data. For example, the system 1000 of FIG. 10 can obtain output data from the non-hourglass autoencoder 1020 and can determine the reconstruction error 103 based on the output data and the input data 1052.

The method 1600 includes, at 1610, performing a comparison of the reconstruction error to an anomaly detection criterion. For example, the comparator 1032 can compare the reconstruction error 1030 to the anomaly detection criterion 1008.

The method 1600 includes, at 1612, generating an anomaly detection output for the one or more devices based on a result of the comparison. The anomaly detection output may indicate presence of an anomaly or may indicate that no anomaly is present. For example, when the reconstruction error 1030 satisfies the anomaly detection criterion 1008, the processor 1010 generates the anomaly detection output 1034. In some implementations, in response to the anomaly detection output 1034 indicating presence of an anomaly, a maintenance action 1036 can be added to a maintenance schedule 1038 or a control signal can be provided to the device(s) 1042.

Figure 17:
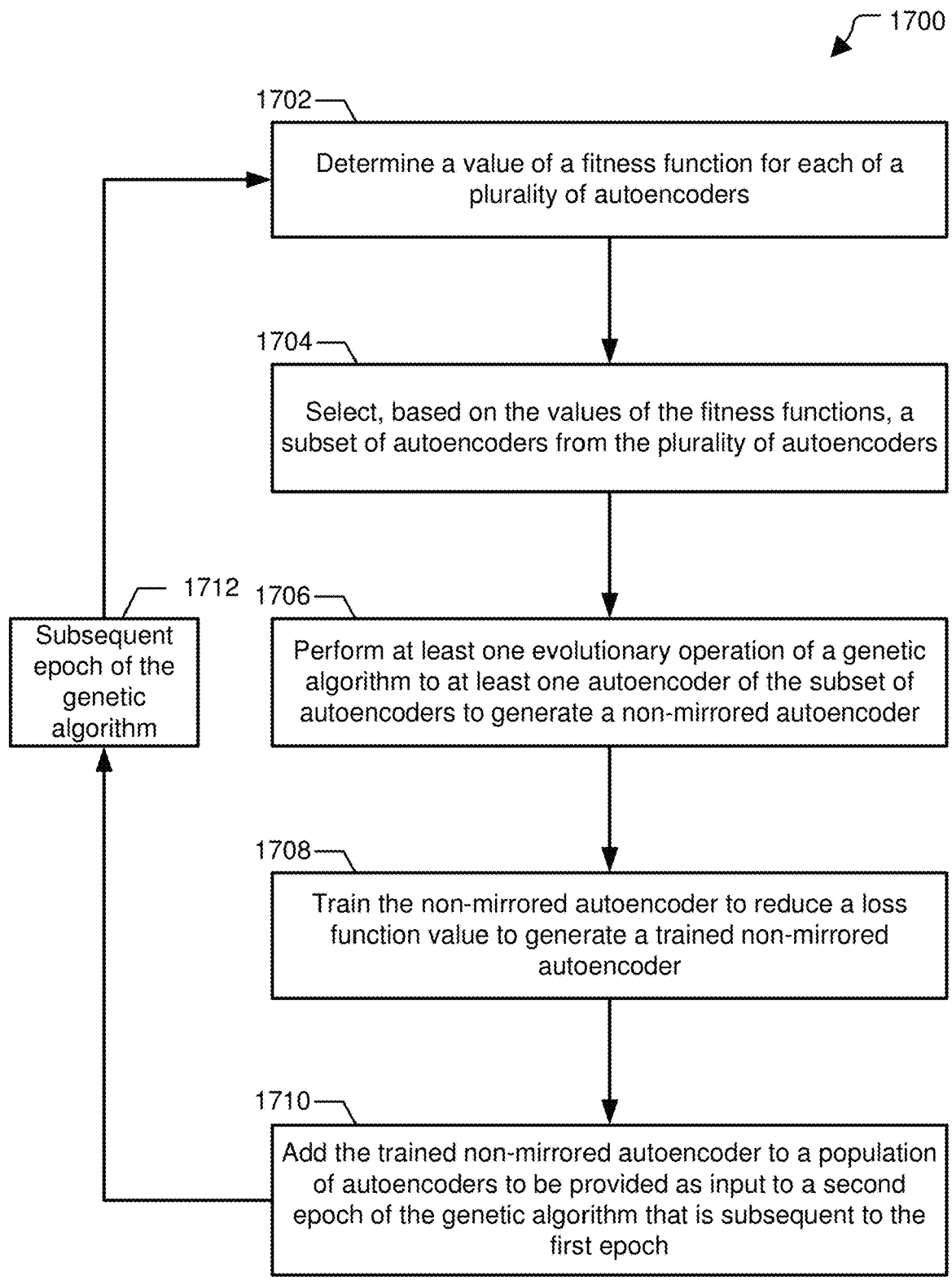
FIG. 17 illustrates another example of a method of cooperative execution of a genetic algorithm and an optimization trainer to generate a non-mirrored autoencoder.

FIG. 17 illustrates another example of a method of cooperative execution of a genetic algorithm and an optimization trainer to generate a non-mirrored autoencoder. In particular, the method 1700 illustrates operations performed during execution of a first epoch of a genetic algorithm. The first epoch can be the initial epoch of the genetic algorithm, or the first epoch can be an epoch after the initial epoch of the genetic algorithm. The method 1700 is a special case of the method 1400 in which the system 100 is not constrained from generating non-mirrored architectures. For example, the system 100 may perform the method 1700 when a user configuration option is selected to enable generation of non-mirrored architectures.

The method 1700 includes, at 1702, determining a value of a fitness function for each of a plurality of autoencoders. The value of the fitness function for a particular autoencoder is indicative of reconstruction error of the particular autoencoder responsive to first data representative of a first operational state of one or more devices. For example, the system 100 of FIG. 1 or 3 can determine the fitness function values 144 based on the fitness function 142 and the first portion 104 of the input data 102. The value of the fitness function 142 for a particular autoencoder 134 is based on the reconstruction loss 316 (also referred to herein as "reconstruction error") of the autoencoder 134.

The method 1700 includes, at 1704, selecting, based on the values of the fitness function, a subset of autoencoders from the plurality of autoencoders. For example, the selection operation 318 can select one or more autoencoders 134 based on the values of the fitness functions (e.g., based on the reconstruction loss 316 of each autoencoders of the input set 120). In a particular implementation, the selection operation 318 preferentially selects autoencoders of the input set 120 that have higher reconstruction loss 316 than other autoencoders of the input set 120.

The method 1700 includes, at 1706, performing at least one evolutionary operation to at least one autoencoder of the subset of autoencoders to generate a non-mirrored autoencoder in which a network architecture of an encoder portion of the non-mirrored autoencoder is not mirrored by a network architecture of a decoder portion of the non-mirrored autoencoder. For example, the non-mirrored autoencoder can have one of the architectures described with reference to FIG. 9A, 9C or 11.

The method 1700 includes, at 1708, training the non-mirrored autoencoder to reduce a loss function value to generate a trained non-mirrored autoencoder. The loss function value is based on reconstruction error of the trainable non-mirrored autoencoder responsive to second data representative of a second operational state of the one or more devices. For example, the system 100 of FIG. 1 or 3 may provide the trainable autoencoder 132 (which for the method 1700 is a non-mirrored autoencoder) to the optimization trainer 160 which may adjust connection link weights of the trainable autoencoder such that reconstruction loss 336 of the trainable autoencoder 132 responsive to the second portion 106 of the input data 102 is reduced.

The method 1700 includes, at 1710, adding the trained non-mirrored autoencoder to a population of autoencoders to be provided as input to a second epoch of the genetic algorithm that is subsequent to the first epoch, and at 1712, initiating or performing the second epoch of the genetic algorithm.

In some implementations, the method 1700 is a subset or type of the method 1300. For example, although the method 1700 does not specifically explain the details of speciation and selecting elite species, the steps of the method 1700 include such operations in some implementation. Further, although the method 1700 does not specifically illustrate a termination criterion, the method 1700 includes a termination decision to end the method and output at least one autoencoder. The termination decision can be disposed between any two operations of the method 1700, or the termination decision can be evaluated multiple times during each epoch, such as after every operation of the method 1700 or after every operation that could change the termination decision, such as each time the fitness of any autoencoder is evaluated.

Figure 18:
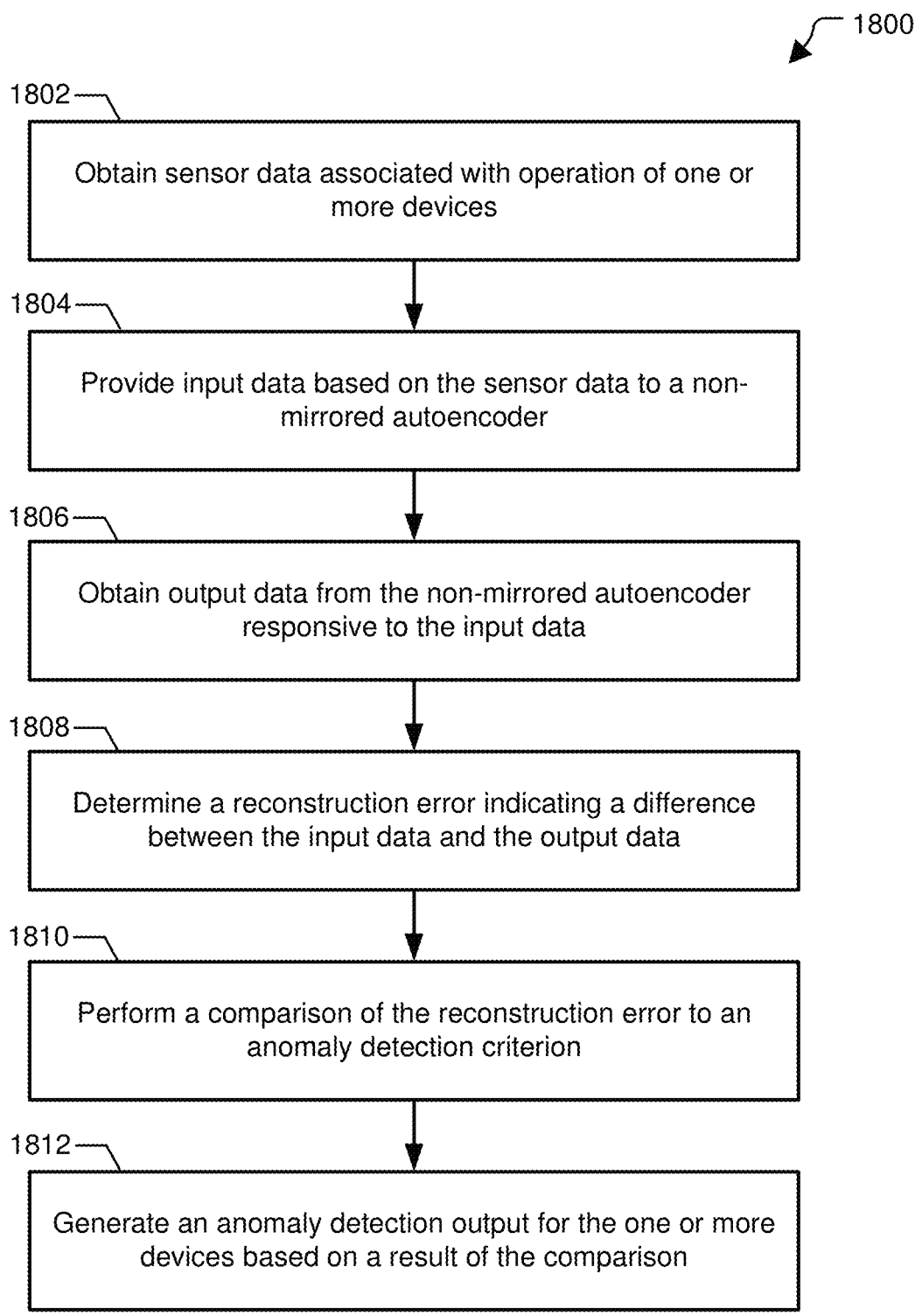
FIG. 18 illustrates an example of a method of using a non-mirrored autoencoder to monitor one or more devices for operational anomalies.

FIG. 18 illustrates an example of a method of using a non-mirrored autoencoder to monitor one or more devices for operational anomalies. For example, the method 1600 may be performed by the computer system 1002 or the processor 1010 of the system 1000 of FIG. 11. As explained above, using a non-mirrored autoencoder to monitor one or more devices may reduce computing resources required to perform the monitoring (relative to using a mirrored autoencoder). For example, a decoder portion of the non-mirrored autoencoder can include fewer nodes or fewer layers than the encoder portion of the non-mirrored autoencoder, thereby requiring fewer processing operations for execution. Further, as explained above, using a non-mirrored autoencoder may also, or in the alternative, improve discrimination between normal and anomalous operation of the device(s).

The method 1800 includes, at 1802, obtaining, at a processor of a computing device, sensor data associated with operation of one or more devices. For example, the interface(s) 1050 can obtain the sensor data 1046 from the sensor(s) 1044 associated with the device(s) 1042. In this example, the sensor data 1046 is indicative of operation of the device(s) 1042. The sensor data 1046 can be obtained directly from the sensor(s) 1044 (e.g., in real-time) or the sensor data 1046 can be pre-processed or stored in a memory (not shown) and subsequently obtained by the interface(s) 1050 (e.g., by reading a memory location storing the sensor data 1046).

The method 1800 includes, at 1804, providing input data based on the sensor data to a non-mirrored autoencoder having an encoder portion and a decoder portion and configured such that a network architecture of the encoder portion is not mirrored by a network architecture of the decoder portion. For example, the non-mirrored autoencoder can have one of the architectures described with reference to FIG. 9A, 9C or 11.

The method 1800 includes, at 1806, obtaining output data from the non-mirrored autoencoder responsive to the input data, and at 1808, determining a reconstruction error indicating a difference between the input data and the output data. For example, the system 1000 of FIG. 11 can obtain output data from the non-mirrored autoencoder 1120 and can determine the reconstruction error 103 based on the output data and the input data 1052.

The method 1800 includes, at 1810, performing a comparison of the reconstruction error to an anomaly detection criterion. For example, the comparator 1032 can compare the reconstruction error 1030 to the anomaly detection criterion 1008.

The method 1800 includes, at 1812, generating an anomaly detection output for the one or more devices based on a result of the comparison. The anomaly detection output may indicate presence of an anomaly or may indicate that no anomaly is present. For example, when the reconstruction error 1030 satisfies the anomaly detection criterion 1008, the processor 1010 generates the anomaly detection output 1034. In some implementations, in response to the anomaly detection output 1034 indicating presence of an anomaly, a maintenance action 1036 can be added to a maintenance schedule 1038 or a control signal can be provided to the device(s) 1042.

Figure 19:
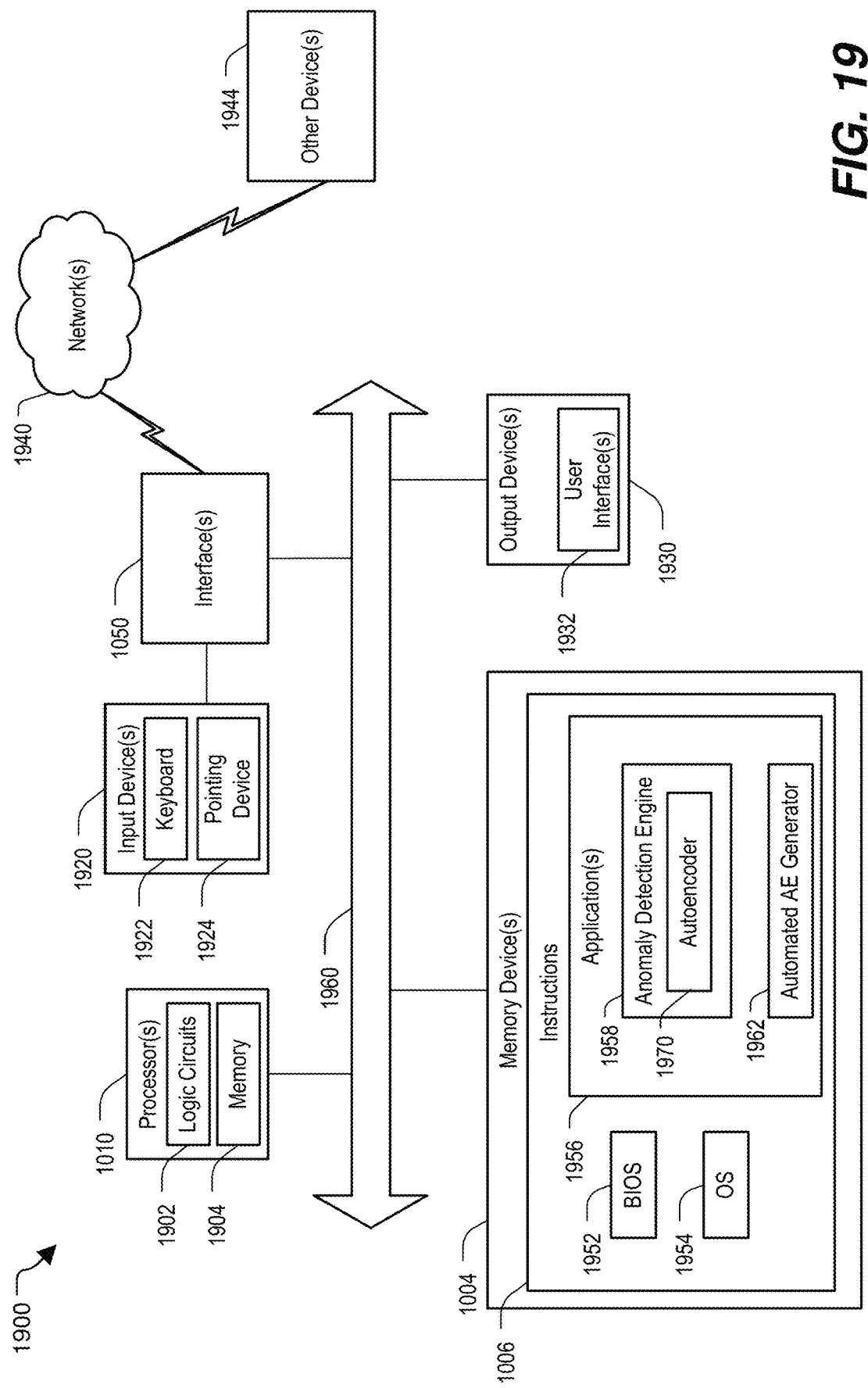
FIG. 19 illustrates an example of a computer system corresponding to one or more of the systems of FIG. 1, 2, 10, or 11 according to particular implementations.

FIG. 19 illustrates an example of a computer system 1900 corresponding to one or more of the systems of FIG. 1, 3, 10, or 11 according to particular implementations. For example, the computer system 1900 is configured to initiate, perform, or control one or more of the operations described with reference to FIG. 4-8 or 13A-18. For example, the computer system 1900 may include, or be included within, the system 100 of FIG. 1 or 3, or the system 1000 of FIG. 10 or 11. The computer system 1900 can be implemented as or incorporated into one or more of various other devices, such as a personal computer (PC), a tablet PC, a server computer, a personal digital assistant (PDA), a laptop computer, a desktop computer, a communications device, a wireless telephone, or any other machine capable of executing a set of instructions (sequential or otherwise) that specify actions to be taken by that machine. Further, while a single computer system 1900 is illustrated, the term "system" includes any collection of systems or sub-systems that individually or jointly execute a set, or multiple sets, of instructions to perform one or more computer functions.

While FIG. 19 illustrates one example of the computer system 1900, other computer systems or computing architectures and configurations may be used for carrying out the automated autoencoder generation or device monitoring operations disclosed herein. The computer system 1900 includes the one or more processors 1010. Each processor of the one or more processors 1010 can include a single processing core or multiple processing cores that operate sequentially, in parallel, or sequentially at times and in parallel at other times. Each processor of the one or more processors 1010 includes circuitry defining a plurality of logic circuits 1902, working memory 1904 (e.g., registers and cache memory), communication circuits, etc., which together enable the processor(s) 1010 to control the operations performed by the computer system 1900 and enable the processor(s) 1010 to generate a useful result based on analysis of particular data and execution of specific instructions.

The processor(s) 1010 are configured to interact with other components or subsystems of the computer system 1900 via a bus 1960. The bus 1960 is illustrative of any interconnection scheme serving to link the subsystems of the computer system 1900, external subsystems or device, or any combination thereof. The bus 1960 includes a plurality of conductors to facilitate communication of electrical and/or electromagnetic signals between the components or subsystems of the computer system 1900. Additionally, the bus 1960 includes one or more bus controllers or other circuits (e.g., transmitters and receivers) that manage signaling via the plurality of conductors and that cause signals sent the plurality of conductors to conform to particular communication protocols.

The computer system 1900 also includes the one or more memory devices 1004. The memory device(s) 1004 include any suitable computer-readable storage device depending on, for example, whether data access needs to be bi-directional or unidirectional, speed of data access required, memory capacity required, other factors related to data access, or any combination thereof. Generally, the memory device(s) 1004 includes some combinations of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc. Examples of non-volatile memory devices and circuits include hard disks, optical disks, flash memory, and certain type of RAM, such as resistive random-access memory (ReRAM). Other examples of both volatile and non-volatile memory devices can be used as well, or in the alternative, so long as such memory devices store information in a physical, tangible medium. Thus, the memory device(s) 1004 include circuit and structures and are not merely signals or other transitory phenomena (i.e., are non-transitory media).

The memory device(s) 1004 store the instructions 1006 that are executable by the processor(s) 1010 to perform various operations and functions. The instructions 1006 include instructions to enable the various components and subsystems of the computer system 1900 to operate, interact with one another, and interact with a user, such as an input/output system (BIOS) 1952 and an operating system (OS) 1954. Additionally, the instructions 1006 include one or more applications 1956, scripts, or other program code to enable the processor(s) 1010 to perform the operations described herein. For example, the instructions 1006 can include an anomaly detection engine 1958 that is executable to use an autoencoder 1970 to perform one or more of the operations described with reference to FIG. 10, 11, 16, or 18. Additionally, or in the alternative, the instructions 1006 can include an automated autoencoder generator 1962 that is executable to perform one or more of the operations described with reference to FIGS. 1, 3-8, 13A and 13B, 14, 15, or 17.

In FIG. 19, the computer system 1900 also includes one or more output devices 1930, one or more input devices 1920, and one or more interface devices 1050. Each of the output device(s) 1930, the input device(s) 1920, and the interface device(s) 1050 can be coupled to the bus 1960 via a port or connector, such as a Universal Serial Bus port, a digital visual interface (DVI) port, a serial ATA (SATA) port, a small computer system interface (SCSI) port, a high-definition media interface (HMDI) port, or another serial or parallel port. In some implementations, one or more of the output device(s) 1930, the input device(s) 1920, the interface device(s) 1050 is coupled to or integrated within a housing with the processor(s) 1010 and the memory device(s) 1004, in which case the connections to the bus 1960 can be internal, such as via an expansion slot or other card-to-card connector. In other implementations, the processor(s) 1010 and the memory device(s) 1004 are integrated within a housing that includes one or more external ports, and one or more of the output device(s) 1930, the input device(s) 1920, the interface device(s) 1050 is coupled to the bus 1960 via the external port(s).

Examples of the output device(s) 1930 include display devices, speakers, printers, televisions, projectors, or other devices to provide output of data in a manner that is perceptible by a user, such as via user interface(s) 1932. Examples of the input device(s) 1920 include buttons, switches, knobs, a keyboard 1922, a pointing device 1924, a biometric device, a microphone, a motion sensor, or another device to detect user input actions. The pointing device 1924 includes, for example, one or more of a mouse, a stylus, a track ball, a pen, a touch pad, a touch screen, a tablet, another device that is useful for interacting with a graphical user interface, or any combination thereof. A particular device may be an input device 1920 and an output device 1930. For example, the particular device may be a touch screen.

The interface device(s) 1050 are configured to enable the computer system 1900 to communicate with one or more other devices 1944 directly or via one or more networks 1940. For example, the interface device(s) 1050 may encode data in electrical and/or electromagnetic signals that are transmitted to the other device(s) 1944 as control signals or packet-based communication using pre-defined communication protocols. As another example, the interface device(s) 1050 may receive and decode electrical and/or electromagnetic signals that are transmitted by the other device(s) 1944. The electrical and/or electromagnetic signals can be transmitted wirelessly (e.g., via propagation through free space), via one or more wires, cables, optical fibers, or via a combination of wired and wireless transmission.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

One or more implementations to automatically generate an autoencoder according to the above disclosure are described below in a set of interrelated clauses.

According to clause 1, a computer system comprises a memory configured to store first data representative of a first operational state of one or more devices, second data representative of a second operational state of the one or more devices, and a plurality of data structures representative of a plurality of autoencoders; and a processor configured to execute a recursive search, wherein executing the recursive search comprises, during a first iteration: determining fitness values for the plurality of autoencoders, wherein a fitness value of a particular autoencoder is based on reconstruction error of the particular autoencoder responsive to the first data; selecting a subset of autoencoders from the plurality of autoencoders based on the fitness values of the subset of autoencoders; performing at least one evolutionary operation to at least one autoencoders of the subset of autoencoders to generate a trainable autoencoder; and providing the trainable autoencoder to an optimization trainer, the optimization trainer configured to: train the trainable autoencoder to reduce a loss function value to generate a trained autoencoders, wherein the loss function value is based on reconstruction error of the trainable autoencoder responsive to the second data; and provide the trained autoencoders as input to a second iteration of the recursive search that is subsequent to the first iteration.

Clause 2 includes the computer system of clause 1, wherein autoencoders having fitness values indicating higher reconstruction error responsive to the first data are selected for the subset of autoencoders in preference to autoencoders having fitness values indicating lower reconstruction error.

Clause 3 includes the computer system of clause 2, wherein the first operational state is an anomalous operational state of the one or more devices and the second operational state is a normal operational state of the one or more devices.

According to clause 4, a method comprises, during execution of a first epoch of a genetic algorithm: determining, by a processor of a computing device, a value of a fitness function for each of a plurality of autoencoders, wherein the value of the fitness function for a particular autoencoder is indicative of reconstruction error of the particular autoencoder responsive to first data representative of a first operational state of one or more devices; selecting, by the processor of the computing device based on the values of the fitness function, a subset of autoencoders from the plurality of autoencoders; performing at least one genetic operation of the genetic algorithm with respect to at least one autoencoder of the subset to generate a trainable autoencoder; training the trainable autoencoder to reduce a loss function value to generate a trained autoencoder, wherein the loss function value is based on reconstruction error of the trainable autoencoder responsive to second data representative of a second operational state of the one or more devices; and adding the trained autoencoder to a population of autoencoders to be provided as input to a second epoch of the genetic algorithm that is subsequent to the first epoch.

Clause 5 includes the method of clause 4, wherein autoencoders having values of the fitness function indicating higher reconstruction error responsive to the first data are selected for the subset of autoencoders in preference to autoencoders having values of the fitness function indicating lower reconstruction error.

Clause 6 includes the method of clause 5, wherein the first operational state is an anomalous operational state of the one or more devices and the second operational state is a normal operational state of the one or more devices.

Clause 7 includes the methods of any of clauses 4 to 6, wherein one or more autoencoders having the values of the fitness function indicating lower reconstruction error are omitted from the population of autoencoders to be provided as input to the second epoch of the genetic algorithm.

Clause 8 includes the methods of any of clauses 4 to 7, wherein the training the trainable autoencoder modifies connection weights of the trainable autoencoder and does not modify an architecture of the trainable autoencoder.

Clause 9 includes the methods of any of clauses 4 to 8, wherein the at least one genetic operation modifies an architecture of the at least one autoencoder.

Clause 10 includes the methods of any of clauses 4 to 9, wherein the at least one genetic operation modifies an activation function of at least one node of the at least one autoencoder.

Clause 11 includes the methods of any of clauses 4 to 10, wherein the at least one genetic operation modifies a layer type of at least one layer of the at least one autoencoder.

Clause 12 includes the methods of any of clauses 4 to 11, wherein the first epoch is an initial epoch of the genetic algorithm.

Clause 13 includes the methods of any of clauses 4 to 12, wherein the first epoch is a non-initial epoch of the genetic algorithm.

Clause 14 includes the methods of any of clauses 4 to 13, wherein the second epoch and the first epoch are separated by at least one epoch.

Clause 15 includes the methods of any of clauses 4 to 14, wherein the at least one genetic operation includes crossover, mutation, or a combination thereof.

According to clause 16, a computer-readable storage device stores instructions that, when executed, cause a computer to perform operations comprising, during execution of a first epoch of a genetic algorithm: determining, by a processor of a computing device, a value of a fitness function for each of a plurality of autoencoders, wherein the value of the fitness function for a particular autoencoder is indicative of reconstruction error of the particular autoencoder responsive to first data representative of a first operational state of one or more devices; selecting, by the processor of the computing device based on the values of the fitness function, a subset of autoencoders from the plurality of autoencoders; performing at least one genetic operation of the genetic algorithm with respect to at least one autoencoder of the subset to generate a trainable autoencoder; training the trainable autoencoder to reduce a loss function value to generate a trained autoencoder, wherein the loss function value is based on reconstruction error of the trainable autoencoder responsive to second data representative of a second operational state of the one or more devices; and adding the trained autoencoder to a population of autoencoders to be provided as input to a second epoch of the genetic algorithm that is subsequent to the first epoch.

Clause 17 includes the computer-readable storage device of clause 16, wherein the first epoch is an initial epoch of the genetic algorithm, each autoencoder of the plurality of autoencoders comprises a latent-space layer, and a count of nodes in the latent-space layer is identical for each autoencoder of the plurality of autoencoders.

Clause 18 includes the computer-readable storage device of clause 17, wherein the at least one genetic operation modifies a count of nodes in the latent-space layer of the at least one autoencoder.

Clause 19 includes the computer-readable storage device of any of clauses 16 to 18, wherein the at least one genetic operation selectively modifies a count of layers in one of an encoder portion or a decoder portion of the at least one autoencoder without modifying a count of layers in the other of the encoder portion or the decoder portion of the at least one autoencoder.

Clause 20 includes the computer-readable storage device of clause 19, wherein selection of the encoder portion or the decoder portion for modification by the at least one genetic operation is a randomized selection in which the encoder portion and the decoder portion have approximately equal likelihoods of being selected irrespective of a count of layers in each before the randomized selection.

Clause 21 includes the computer-readable storage device of any of clauses 16 to 20, wherein the at least one genetic operation selectively modifies a count of nodes in one or more layers of the at least one autoencoder.

Clause 22 includes the computer-readable storage device of clause 21, wherein modification of the count of nodes for layers in an encoder portion of the at least one autoencoder is constrained such that layers that are closer to a latent-space layer have a count of nodes that is less than or equal to a count of nodes of each layer that is closer to an input layer.

Clause 23 includes the computer-readable storage device of clause 21, wherein modification of the count of nodes for layers in a decoder portion of the at least one autoencoder is constrained such that layers that are closer to a latent-space layer have a count of nodes that is less than or equal to a count of nodes of each layer that is closer to an output layer.

Clause 24 includes the computer-readable storage device of any of clauses 16 to 23, wherein the trainable autoencoder has a non-hourglass network architecture including at least a first layer having a first count of nodes, a second layer having a second count of nodes, and a third layer having a third count of nodes, wherein the second layer is disposed between the first layer and the third layer, and wherein the second count of nodes is greater than the first count of nodes and the second count of nodes is greater than the third count of nodes.

Clause 25 includes the computer-readable storage device of any of clauses 16 to 24, wherein an encoder portion of the trainable autoencoder has more layers than a decoder portion of the trainable autoencoder.

One or more implementations to automatically generate or use a non-hourglass autoencoder according to the above disclosure are described below in a set of interrelated clauses.

According to clause 1, a computer system comprises a memory configured to store input data and a plurality of data structures representative of a plurality of autoencoders; a processor configured to execute a recursive search, wherein executing the recursive search comprises, during a first iteration: determining, for each autoencoder of the plurality of autoencoders, a fitness value based on a reconstruction error of the autoencoder responsive to a first portion of the input data; selecting a subset of autoencoders from the plurality of autoencoders based on fitness values of the subset of autoencoders; performing at least one evolutionary operation to at least one autoencoders of the subset of autoencoders to generate a non-hourglass autoencoder having a network architecture including at least a first layer having a first count of nodes, a second layer having a second count of nodes, and a third layer having a third count of nodes, wherein the second layer is disposed between the first layer and the third layer, and wherein the second count of nodes is greater than the first count of nodes and the second count of nodes is greater than the third count of nodes; providing the non-hourglass autoencoder to an optimization trainer to generate a trained non-hourglass autoencoder; and providing the trained non-hourglass autoencoder as input to a second iteration of the recursive search that is subsequent to the first iteration.

Clause 2 includes the computer system of clause 1, wherein autoencoders having fitness values indicating higher reconstruction error responsive to the first portion of the input data are selected for the subset of autoencoders in preference to autoencoders having fitness values indicating lower reconstruction error.

Clause 3 includes the computer system of clause 2, wherein the first portion of the input data corresponds to data captured during an anomalous operational state of one or more devices and the optimization trainer trains the non-hourglass autoencoder to reduce reconstruction error responsive to a second portion of the input data corresponding to data captured during one or more normal operational states of the one or more devices.

According to clause 4, a method comprises, during execution of a first epoch of a genetic algorithm: determining, by a processor of a computing device, a value of a fitness function for each of a plurality of autoencoders; selecting, by the processor of the computing device based on the values of the fitness function, a subset of autoencoders from the plurality of autoencoders; performing at least one evolutionary operation to at least one autoencoders of the subset of autoencoders to generate a non-hourglass autoencoder having a network architecture including at least a first layer having a first count of nodes, a second layer having a second count of nodes, and a third layer having a third count of nodes, wherein the second layer is disposed between the first layer and the third layer, and wherein the second count of nodes is greater than the first count of nodes and the second count of nodes is greater than the third count of nodes; training the non-hourglass autoencoder to reduce a loss function value to generate a trained non-hourglass autoencoder; and adding the trained non-hourglass autoencoder to a population of autoencoders to be provided as input to a second epoch of the genetic algorithm that is subsequent to the first epoch.

Clause 5 includes the method of clause 4, wherein autoencoders having values of the fitness function indicating higher reconstruction error responsive to first data are selected for the subset of autoencoders in preference to autoencoders having values of the fitness function indicating lower reconstruction error, and the loss function value is determined based on reconstruction error responsive to second data, wherein the first data represents a first operational state of one or more devices and the second data represents a second operational state of the one or more devices.

Clause 6 includes the method of clause 5, wherein the first operational state is an anomalous operational state of the one or more devices and the second operational state is a normal operational state of the one or more devices.

Clause 7 includes the method of any of clauses 4 to 6, wherein one or more autoencoders having values of the fitness function indicating lower reconstruction error are omitted from the population of autoencoders to be provided as input to the second epoch of the genetic algorithm.

Clause 8 includes the method of any of clauses 4 to 7, wherein the training the non-hourglass autoencoder modifies connection weights of the non-hourglass autoencoder and does not modify an architecture of the non-hourglass autoencoder.

Clause 9 includes the method of any of clauses 4 to 8, wherein the at least one evolutionary operation modifies an architecture of the at least one autoencoder to generate the non-hourglass autoencoder.

Clause 10 includes the method of any of clauses 4 to 9, wherein the at least one evolutionary operation modifies an activation function of at least one node of the at least one autoencoder.

Clause 11 includes the method of any of clauses 4 to 10, wherein the at least one evolutionary operation modifies a layer type of at least one layer of the at least one autoencoder.

Clause 12 includes the method of any of clauses 4 to 11, wherein the first epoch is an initial epoch of the genetic algorithm.

Clause 13 includes the method of any of clauses 4 to 12, wherein the first epoch is a non-initial epoch of the genetic algorithm.

Clause 14 includes the method of any of clauses 4 to 13, wherein the second epoch and the first epoch are separated by at least one epoch.

Clause 15 includes the method of any of clauses 4 to 14, wherein the at least one evolutionary operation includes crossover, mutation, or a combination thereof.

According to clause 16, a computer-readable storage device stores instructions that, when executed, cause a computer to perform operations comprising, during execution of a first epoch of a genetic algorithm: determining a value of a fitness function for each of a plurality of autoencoders; selecting, based on the values of the fitness function, a subset of autoencoders from the plurality of autoencoders; performing at least one evolutionary operation to at least one autoencoders of the subset of autoencoders to generate a non-hourglass autoencoder having a network architecture including at least a first layer having a first count of nodes, a second layer having a second count of nodes, and a third layer having a third count of nodes, wherein the second layer is disposed between the first layer and the third layer, and wherein the second count of nodes is greater than the first count of nodes and the second count of nodes is greater than the third count of nodes; training the non-hourglass autoencoder to reduce a loss function value to generate a trained non-hourglass autoencoder; and adding the trained non-hourglass autoencoder to a population of autoencoders to be provided as input to a second epoch of the genetic algorithm that is subsequent to the first epoch.

Clause 17 includes the computer-readable storage device of clause 16, wherein the first epoch is an initial epoch of the genetic algorithm, each autoencoder of the plurality of autoencoders comprises a latent-space layer, and a count of nodes in the latent-space layer is identical for each autoencoder of the plurality of autoencoders.

Clause 18 includes the computer-readable storage device of clause 17, wherein the operations further comprise performing at least one second genetic operation to modify a count of nodes in the latent-space layer of at least one second autoencoder.

Clause 19 includes the computer-readable storage device of any of clauses 16 to 18, wherein the at least one evolutionary operation selectively modifies a count of layers in one of an encoder portion or a decoder portion of the at least one autoencoder without modifying a count of layers in the other of the encoder portion or the decoder portion of the at least one autoencoder.

Clause 20 includes the computer-readable storage device of clause 19, wherein selection of the encoder portion or the decoder portion for modification by the at least one evolutionary operation is a randomized selection in which the encoder portion and the decoder portion have approximately equal likelihoods of being selected irrespective of a count of layers in each before the randomized selection.

Clause 21 includes the computer-readable storage device of any of clauses 16 to 20, wherein an encoder portion of the non-hourglass autoencoder has more layers than a decoder portion of the non-hourglass autoencoder.

According to clause 22, a computer system comprises an interface to receive sensor data indicative of operation of one or more devices; and a processor configured to: provide input data based on the sensor data to a non-hourglass autoencoder having a network architecture including at least a first layer having a first count of nodes, a second layer having a second count of nodes, and a third layer having a third count of nodes, wherein the second layer is disposed between the first layer and the third layer, and wherein the second count of nodes is greater than the first count of nodes and the second count of nodes is greater than the third count of nodes; obtain output data from the non-hourglass autoencoder responsive to the input data; determine a reconstruction error indicating a difference between the input data and the output data; perform a comparison of the reconstruction error to an anomaly detection criterion; and generate an anomaly detection output for the one or more devices based on a result of the comparison.

Clause 23 includes the computer system of clause 22, wherein the processor is further configured to send a control signal to the one or more devices based on the anomaly detection output.

Clause 24 includes the computer system of clause 22 or clause 23, wherein the processor is further configured to schedule a maintenance action for the one or more devices based on the anomaly detection output.

According to clause 25, a method comprises obtaining, at a processor of a computing device, sensor data associated with operation of one or more devices; providing, by the processor, input data based on the sensor data to a non-hourglass autoencoder having a network architecture including at least a first layer having a first count of nodes, a second layer having a second count of nodes, and a third layer having a third count of nodes, wherein the second layer is disposed between the first layer and the third layer, and wherein the second count of nodes is greater than the first count of nodes and the second count of nodes is greater than the third count of nodes; obtaining, by the processor, output data from the non-hourglass autoencoder responsive to the input data; determining, by the processor, a reconstruction error indicating a difference between the input data and the output data; performing, by the processor, a comparison of the reconstruction error to an anomaly detection criterion; and generating, by the processor, an anomaly detection output for the one or more devices based on a result of the comparison.

Clause 26 includes the method of clause 25, wherein the sensor data includes real-time from one or more sensors coupled to or associated with the one or more devices.

According to clause 27, a computer-readable storage device stores instructions that, when executed, cause a computer to perform operations comprising: obtaining sensor data associated with operation of one or more devices; providing input data based on the sensor data to a non-hourglass autoencoder having a network architecture including at least a first layer having a first count of nodes, a second layer having a second count of nodes, and a third layer having a third count of nodes, wherein the second layer is disposed between the first layer and the third layer, and wherein the second count of nodes is greater than the first count of nodes and the second count of nodes is greater than the third count of nodes; obtaining output data from the non-hourglass autoencoder responsive to the input data; determining a reconstruction error indicating a difference between the input data and the output data; performing a comparison of the reconstruction error to an anomaly detection criterion; and generating an anomaly detection output for the one or more devices based on a result of the comparison.

One or more implementations to automatically generate or use a non-mirrored autoencoder according to the above disclosure are described below in a set of interrelated clauses.

According to clause 1, a computer system comprises a memory configured to store input data and a plurality of data structures representative of a plurality of autoencoders, each autoencoder of the plurality of autoencoders including an encoder portion and a decoder portion and a processor configured to execute a recursive search, wherein executing the recursive search comprises, during a first iteration: determining, for each autoencoder of the plurality of autoencoders, a fitness value based on a reconstruction error of the autoencoder responsive to a first portion of the input data; selecting a subset of autoencoders from the plurality of autoencoders based on fitness values of the subset of autoencoders; performing at least one evolutionary operation to at least one autoencoder of the subset of autoencoders to generate a non-mirrored autoencoder in which a network architecture of the encoder portion of the non-mirrored autoencoder is not mirrored by a network architecture of the decoder portion of the non-mirrored autoencoder; providing the non-mirrored autoencoder to an optimization trainer to generate a trained non-mirrored autoencoder; and providing the trained non-mirrored autoencoder as input to a second iteration of the recursive search that is subsequent to the first iteration.

Clause 2 includes the computer system of clause 1, wherein autoencoders having fitness values indicating higher reconstruction error responsive to the first portion of the input data are selected for the subset of autoencoders in preference to autoencoders having fitness values indicating lower reconstruction error.

Clause 3 includes the computer system of clause 2, wherein the first portion of the input data corresponds to data captured during an anomalous operational state of one or more devices and the optimization trainer trains the non-mirrored autoencoder to reduce reconstruction error responsive to a second portion of the input data corresponding to data captured during one or more normal operational states of the one or more devices.

According to clause 4, a method comprises, during execution of a first epoch of a genetic algorithm: determining, by a processor of a computing device, a value of a fitness function for each of a plurality of autoencoders; selecting, by the processor of the computing device based on the values of the fitness function, a subset of autoencoders from the plurality of autoencoders; performing, by the processor of the computing device, at least one evolutionary operation to at least one autoencoder of the subset of autoencoders to generate a non-mirrored autoencoder in which a network architecture of an encoder portion of the non-mirrored autoencoder is not mirrored by a network architecture of a decoder portion of the non-mirrored autoencoder; training the non-mirrored autoencoder to reduce a loss function value to generate a trained non-mirrored autoencoder; and adding the trained non-mirrored autoencoder to a population of autoencoders to be provided as input to a second epoch of the genetic algorithm that is subsequent to the first epoch.

Clause 5 includes the computer system of clause 4, wherein autoencoders having values of the fitness function indicating higher reconstruction error responsive to first data are selected for the subset of autoencoders in preference to autoencoders having values of the fitness function indicating lower reconstruction error, and the loss function value is determined based on reconstruction error responsive to second data, wherein the first data represents a first operational state of one or more devices and the second data represents a second operational state of the one or more devices.

Clause 6 includes the computer system of clause 5, wherein the first operational state is an anomalous operational state of the one or more devices and the second operational state is a normal operational state of the one or more devices.

Clause 7 includes the computer system of any of clauses 4 to 6, wherein one or more autoencoders having values of the fitness function indicating lower reconstruction error are omitted from the population of autoencoders to be provided as input to the second epoch of the genetic algorithm.

Clause 8 includes the computer system of any of clauses 4 to 7, wherein the training the non-mirrored autoencoder modifies connection weights of the non-mirrored autoencoder and does not modify an architecture of the non-mirrored autoencoder.

Clause 9 includes the computer system of any of clauses 4 to 8, wherein the at least one evolutionary operation modifies an architecture of the at least one autoencoder to generate the non-mirrored autoencoder.

Clause 10 includes the computer system of any of clauses 4 to 9, wherein the at least one evolutionary operation modifies an activation function of at least one node of the at least one autoencoder.

Clause 11 includes the computer system of any of clauses 4 to 10, wherein the at least one evolutionary operation modifies a layer type of at least one layer of the at least one autoencoder.

Clause 12 includes the computer system of any of clauses 4 to 11, wherein the first epoch is an initial epoch of the genetic algorithm.

Clause 13 includes the computer system of any of clauses 4 to 12, wherein the first epoch is a non-initial epoch of the genetic algorithm.

Clause 14 includes the computer system of any of clauses 4 to 13, wherein the second epoch and the first epoch are separated by at least one epoch.

Clause 15 includes the computer system of any of clauses 4 to 14, wherein the at least one evolutionary operation includes crossover, mutation, or a combination thereof.

According to clause 16, a computer-readable storage device stores instructions that, when executed, cause a computer to perform operations comprising, during execution of a first epoch of a genetic algorithm: determining, by a processor of a computing device, a value of a fitness function for each of a plurality of autoencoders; selecting, by the processor of the computing device based on the values of the fitness function, a subset of autoencoders from the plurality of autoencoders; performing at least one evolutionary operation to at least one autoencoder of the subset of autoencoders to generate a non-mirrored autoencoder in which a network architecture of an encoder portion of the non-mirrored autoencoder is not mirrored by a network architecture of a decoder portion of the non-mirrored autoencoder; training the non-mirrored autoencoder to reduce a loss function value to generate a trained non-mirrored autoencoder; and adding the trained non-mirrored autoencoder to a population of autoencoders to be provided as input to a second epoch of the genetic algorithm that is subsequent to the first epoch.

Clause 17 includes the computer-readable storage device of clause 16, wherein the first epoch is an initial epoch of the genetic algorithm, each autoencoder of the plurality of autoencoders comprises a latent-space layer, and a count of nodes in the latent-space layer is identical for each autoencoder of the plurality of autoencoders.

Clause 18 includes the computer-readable storage device of clause 17, wherein the operations further comprise performing at least one second evolutionary operation to modify a count of nodes in the latent-space layer of at least one second autoencoder.

Clause 19 includes the computer-readable storage device of any of clauses 16 to 18, wherein the at least one evolutionary operation selectively modifies a count of layers in one of the encoder portion or the decoder portion of the at least one autoencoder without modifying a count of layers in the other of the encoder portion or the decoder portion of the at least one autoencoder.

Clause 20 includes the computer-readable storage device of clause 19, wherein selection of the encoder portion or the decoder portion for modification by the at least one evolutionary operation is a randomized selection in which the encoder portion and the decoder portion have approximately equal likelihoods of being selected irrespective of a count of layers in each before the randomized selection.

Clause 21 includes the computer-readable storage device of any of clauses 16 to 20, wherein the at least one evolutionary operation selectively modifies a layer type of a layer in one of the encoder portion or the decoder portion of the at least one autoencoder without modifying layer types of layers in the other of the encoder portion or the decoder portion of the at least one autoencoder.

Clause 22 includes the computer-readable storage device of any of clauses 16 to 21, wherein the at least one evolutionary operation selectively modifies a count of nodes in one of the encoder portion or the decoder portion of the at least one autoencoder without modifying a count of nodes in the other of the encoder portion or the decoder portion of the at least one autoencoder.

Clause 23 includes the computer-readable storage device of any of clauses 16 to 22, wherein the encoder portion of the non-mirrored autoencoder has more layers than the decoder portion of the non-mirrored autoencoder.

According to clause 24, a computer system comprises an interface to receive sensor data indicative of operation of one or more devices; and a processor configured to: provide input data based on the sensor data to a non-mirrored autoencoder having an encoder portion and a decoder portion and configured such that a network architecture of the encoder portion is not mirrored by a network architecture of the decoder portion; obtain output data from the non-mirrored autoencoder responsive to the input data; determine a reconstruction error indicating a difference between the input data and the output data; perform a comparison of the reconstruction error to an anomaly detection criterion;

and generate an anomaly detection output for the one or more devices based on a result of the comparison.

Clause 25 includes the computer system of clause 24, wherein the processor is further configured to send a control signal to the one or more devices based on the anomaly detection output.

Clause 26 includes the computer system of clause 24 or clause 25, wherein the processor is further configured to schedule a maintenance action for the one or more devices based on the anomaly detection output.

According to clause 27 a method comprises obtaining, at a processor of a computing device, sensor data associated with operation of one or more devices; providing, by the processor, input data based on the sensor data to a non-mirrored autoencoder having an encoder portion and a decoder portion and configured such that a network architecture of the encoder portion is not mirrored by a network architecture of the decoder portion; obtaining, by the processor, output data from the non-mirrored autoencoder responsive to the input data; determining, by the processor, a reconstruction error indicating a difference between the input data and the output data; performing, by the processor, a comparison of the reconstruction error to an anomaly detection criterion; and generating, by the processor, an anomaly detection output for the one or more devices based on a result of the comparison.

Clause 28 includes the method of clause 27, wherein the sensor data includes real-time from one or more sensors coupled to or associated with the one or more devices.

According to clause 29, a computer-readable storage device stores instructions that, when executed, cause a computer to perform operations comprising: obtaining sensor data associated with operation of one or more devices; provide input data based on the sensor data to a non-mirrored autoencoder having an encoder portion and a decoder portion and configured such that a network architecture of the encoder portion is not mirrored by a network architecture of the decoder portion; obtaining output data from the non-mirrored autoencoder responsive to the input data; determining a reconstruction error indicating a difference between the input data and the output data; performing a comparison of the reconstruction error to an anomaly detection criterion; and generating an anomaly detection output for the one or more devices based on a result of the comparison.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. A computer-readable storage medium or device is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computer system comprising:
    an interface to receive sensor data indicative of operation of one or more devices from a sensor distinct from the interface, wherein the sensor data includes status data indicative of uptime for the one or more devices; and
    a processor configured to:
        provide input data based on the sensor data to a dimensional-reduction model, wherein the dimensional-reduction model has a decoder portion and an encoder portion, wherein the decoder portion and the encoder portion are not mirrored;
        obtain output data from the dimensional-reduction model responsive to the input data;
        determine a particular reconstruction error indicating a difference between the input data and the output data;
        perform a comparison of the particular reconstruction error to an anomaly detection criterion, wherein the dimensional-reduction model is configured to generate a reconstruction error that satisfies the anomaly detection criterion responsive to the input data corresponding to historical data associated with a time period prior to a historical device failure or a historical fault condition, the time period distinct from a particular time corresponding to the historical device failure or historical fault condition; and
        generate an anomaly detection output for the one or more devices based on a result of the comparison during operation of the one or more devices, wherein the anomaly detection output selectively predicts a future anomaly based on the result of the comparison, wherein the anomaly detection output is generated responsive to a determination that an average value based on the particular reconstruction error is greater than a threshold specified by the anomaly detection criterion, and wherein the anomaly detection output identifies a corrective action to prevent the future anomaly responsive to predicting the future anomaly.

2. The computer system of claim 1, wherein the dimensional-reduction model includes a plurality of hardware implemented nodes.

3. The computer system of claim 1, wherein the corrective action comprises scheduling a maintenance action for the one or more devices based on the anomaly detection output, wherein the maintenance action includes shutting down the one or more devices, changing one or more operational parameters of the one or more devices, restarting the one or more devices, resetting the one or more devices, or a combination thereof.

4. The computer system of claim 1, wherein the status data includes timestamped sensor readings acquired by the sensor, wherein the timestamped sensor readings are indicative of the uptime.

5. The computer system of claim 1, wherein the time period immediately precedes the particular time.

6. The computer system of claim 1, wherein sensor data includes temperature data, pressure data, rotation rate data, vibration data, power level data, or a combination thereof.

7. The computer system of claim 1, further comprising receiving device data indicating one or more times when the one or more devices were operational, wherein the one or more devices are distinct from the processor.

8. The computer system of claim 1, wherein the decoder portion includes a plurality of layers arranged from a latent-space layer toward an output layer, and wherein each layer closer to the latent-space layer has a count of nodes that is less than or equal to a count of nodes of each layer that is closer to the output layer.

9. A method comprising:
    obtaining, at a processor of a computing device via an interface, sensor data associated with operation of one or more devices from a sensor distinct from the interface, wherein the sensor data includes status data indicative of uptime for the one or more devices;
    providing, by the processor, input data based on the sensor data to a dimensional-reduction model, wherein the dimensional-reduction model has a decoder portion and an encoder portion;
    obtaining, by the processor, output data from the dimensional-reduction model responsive to the input data;
    determining, by the processor, a particular reconstruction error indicating a difference between the input data and the output data;
    performing, by the processor, a comparison of the particular reconstruction error to an anomaly detection criterion, wherein the dimensional-reduction model is configured to generate a reconstruction error that satisfies the anomaly detection criterion responsive to the input data corresponding to historical data associated with a time period prior to a historical device failure or a historical fault condition, the time period distinct from a particular time corresponding to the historical device failure or historical fault condition; and
    generating, by the processor, an anomaly detection output for the one or more devices based on a result of the comparison during operation of the one or more devices, wherein the anomaly detection output selectively predicts a future anomaly based on the result of the comparison, wherein the anomaly detection output is generated responsive to a determination that an average value based on the particular reconstruction error is greater than a threshold specified by the anomaly detection criterion, and wherein the anomaly detection output identifies a corrective action to prevent the future anomaly responsive to predicting the future anomaly.

10. The method of claim 9, wherein the sensor data includes real-time data from one or more sensors coupled to or associated with the one or more devices.

11. The method of claim 9, wherein the anomaly detection output is generated responsive to a determination that the particular reconstruction error is greater than a threshold specified by the anomaly detection criterion.

12. The method of claim 9, wherein the dimensional-reduction model includes a plurality of hardware implemented nodes.

13. The method of claim 9, wherein the status data includes timestamped sensor readings acquired by the sensor, wherein the timestamped sensor readings are indicative of the uptime.

14. The method of claim 9, further comprising sending the anomaly detection output to a computer system to cause the computer system to update a maintenance schedule associated with the one or more devices based on detection of anomalous operation of the one or more devices.

15. The method of claim 9, further comprising sending the anomaly detection output to at least one device of the one or more devices to change one or more operational parameters of the at least one device.

16. The method of claim 9, further comprising sending the anomaly detection output to at least one device of the one or more devices to cause the at least one device to shut down, restart, or reset.

17. The method of claim 9, wherein the status data further includes data indicative of downtime for the one or more devices.

18. The method of claim 9, wherein a count of layers of the encoder portion is not equal to a count of layers of the decoder portion.

19. The method of claim 9, wherein the encoder portion includes a plurality of layers, and wherein a count of nodes per layer monotonically decreases from an input layer toward a latent-space layer.

20. The method of claim 9, wherein the decoder portion includes a plurality of layers, and wherein a count of nodes per layer monotonically increases from a latent-space layer toward an output layer.

21. A computer-readable storage hardware device storing instructions that, when executed, cause a computer to perform operations comprising:
obtaining sensor data, via an interface, associated with operation of one or more devices from a sensor distinct from the interface, wherein the sensor data includes status data indicative of uptime for the one or more devices;
providing input data based on the sensor data to a dimensional-reduction model, wherein the dimensional-reduction model has a decoder portion and an encoder portion;
obtaining output data from the dimensional-reduction model responsive to the input data;
determining a particular reconstruction error indicating a difference between the input data and the output data;
performing a comparison of the particular reconstruction error to an anomaly detection criterion, wherein the dimensional-reduction model is configured to generate a reconstruction error that satisfies the anomaly detection criterion responsive to the input data corresponding to historical data associated with a time period prior to a historical device failure or a historical fault condition, the time period distinct from a particular time corresponding to the historical device failure or historical fault condition; and
generating an anomaly detection output for the one or more devices based on a result of the comparison during operation of the one or more devices, wherein the anomaly detection output selectively predicts a future anomaly based on the result of the comparison, wherein the anomaly detection output is generated responsive to a determination that an average value based on the particular reconstruction error is greater than a threshold specified by the anomaly detection criterion, and wherein the anomaly detection output identifies a corrective action to prevent the future anomaly responsive to predicting the future anomaly.

22. The computer-readable storage hardware device of claim 21, wherein the decoder portion and the encoder portion are not mirrored.

23. The computer-readable storage hardware device of claim 21, wherein the dimensional-reduction model includes at least a first layer having a first count of nodes, a second layer having a second count of nodes, and a third layer having a third count of nodes, wherein the second layer is disposed between the first layer and the third layer, and wherein the second count of nodes is greater than the first count of nodes and the second count of nodes is greater than the third count of nodes, wherein the dimensional-reduction model comprises a latent-space layer between the encoder portion and the decoder portion, wherein the first layer, the second layer, and the third layer are layers of the encoder portion, and wherein layers of the encoder portion do not mirror layers of the decoder portion.

24. The computer-readable storage hardware device of claim 21, wherein the decoder portion and the encoder portion are mirrored.

25. The computer-readable storage hardware device of claim 21, wherein the status data includes timestamped sensor readings acquired by the sensor, wherein the timestamped sensor readings are indicative of the uptime.

26. A method comprising:
obtaining, at a processor of a computing device via an interface, sensor data associated with operation of one or more devices from a sensor distinct from the interface, wherein the sensor data includes status data indicative of uptime for the one or more devices;
determining, at the processor of and based on the sensor data, a particular reconstruction error of a dimensional-reduction model, wherein the dimensional-reduction model has a decoder portion and an encoder portion, wherein the decoder portion and the encoder portion are not mirrored; and
determining, at the processor, whether the sensor data is indicative of future anomalous operation of the one or more devices based on the particular reconstruction error during operation of the one or more devices, wherein the dimensional-reduction model is configured to generate a reconstruction error that indicates anomalous operation responsive to the sensor data corresponding to historical data associated with a time period prior to a historical device failure or a historical fault condition, the time period distinct from a particular time corresponding to the historical device failure or historical fault condition, wherein the sensor data is determined to be indicative of the future anomalous operation responsive to a determination that an average value based on the particular reconstruction error is greater than a threshold specified by an anomaly detection criterion; and identifying a corrective action to prevent the future anomalous operation responsive to determining that the sensor data is indicative of the future anomalous operation.

* * * * *